United States Patent
Sugahara

(10) Patent No.: US 8,611,827 B2
(45) Date of Patent: Dec. 17, 2013

(54) SYSTEM, METHOD, AND PROGRAM FOR CORRECTING RADIOWAVE ENVIRONMENT DATA

(75) Inventor: Hiroto Sugahara, Tokyo (JP)

(73) Assignee: NEC Corporation, Tokyo (JP)

(*) Notice: Subject to any disclaimer, the term of this patent is extended or adjusted under 35 U.S.C. 154(b) by 274 days.

(21) Appl. No.: 13/133,531

(22) PCT Filed: Dec. 4, 2009

(86) PCT No.: PCT/JP2009/006625
§ 371 (c)(1),
(2), (4) Date: Jun. 8, 2011

(87) PCT Pub. No.: WO2010/067560
PCT Pub. Date: Jun. 17, 2010

(65) Prior Publication Data
US 2011/0244901 A1 Oct. 6, 2011

(30) Foreign Application Priority Data
Dec. 9, 2008 (JP) ................................. 2008-313261

(51) Int. Cl.
*H04B 17/00* (2006.01)

(52) U.S. Cl.
USPC ...................... 455/67.11; 455/446; 455/67.16; 455/456.1; 455/423; 455/422.1; 455/277.2; 702/124; 702/181; 343/713; 343/741

(58) Field of Classification Search
USPC ............. 455/67.11, 446, 67.16, 456.1, 422.1, 455/277.2, 423, 424; 702/124, 181; 703/13; 343/713, 741
See application file for complete search history.

(56) References Cited

U.S. PATENT DOCUMENTS 5,752,167 A * 5/1998 Kitayoshi .................. 455/67.11
6,341,223 B1 * 1/2002 Park .............................. 455/446

(Continued)

FOREIGN PATENT DOCUMENTS

| JP | 07-027805 A | 1/1995 |
| JP | 09-121193 A | 5/1997 |
| JP | 2002-016556 A | 1/2002 |
| JP | 2004-031100 A | 1/2004 |
| JP | 2005-102276 A | 4/2005 |
| JP | 2005-229453 A | 8/2005 |

OTHER PUBLICATIONS

Hiroto Sugahara, et al., "Accuracy Enhancement of Measurement assisted Ray-Launching Method using Road Information", Proceedings of the IEICE General Conference Tsushin Mar. 1, 2009, p. 11, vol. 2009.

(Continued)

*Primary Examiner* — Marceau Milord
(74) *Attorney, Agent, or Firm* — Sughrue Mion, PLLC

(57) ABSTRACT

Radiowave environment data correction that uses the data measurement results obtained at measuring points in a base station peripheral area provided for a wireless communications system, is achieved accurately at a limited number of measuring points. A radiowave environment data correcting system includes correction data determining means that determines correction data for sub-areas, the sub-areas being regions into which an assessment area is divided, on the basis of data measurement results obtained at measuring points belonging to the sub-areas, wherein division into the area is based on an area usage division that is a division predefined according to a particular layout of objects or spaces in the assessment area. The system may also include sub-area dividing means that divides the assessment area into sub-areas in accordance with the area usage division, correction data calculating means that calculates the correction data in the sub-areas using the data measurement results obtained at the measuring points existing in the sub-areas, and radiowave environment data correcting means that uses the calculated correction data to correct radiowave environment data present inside the sub-areas.

22 Claims, 15 Drawing Sheets

(56) References Cited

U.S. PATENT DOCUMENTS

| | | | |
|---|---|---|---|
| 6,889,051 B2* | 5/2005 | Ogino et al. | 455/456.1 |
| 6,985,839 B1* | 1/2006 | Motamedi et al. | 703/6 |
| 6,990,061 B2* | 1/2006 | Deneire et al. | 370/210 |
| 7,085,697 B1* | 8/2006 | Rappaport et al. | 703/13 |
| 7,096,173 B1* | 8/2006 | Rappaport et al. | 703/13 |
| 7,164,883 B2* | 1/2007 | Rappaport et al. | 455/3.01 |
| 7,509,097 B2* | 3/2009 | Irie et al. | 455/67.13 |
| 7,570,922 B2* | 8/2009 | Williams | 455/67.11 |
| 7,580,712 B2* | 8/2009 | Nordling | 455/446 |
| 7,634,265 B2* | 12/2009 | Sugahara et al. | 455/423 |
| 7,840,218 B2* | 11/2010 | Stola et al. | 455/446 |
| 7,873,361 B2* | 1/2011 | Lanzo et al. | 455/446 |
| 7,933,605 B2* | 4/2011 | Rappaport et al. | 455/446 |
| 8,111,628 B2* | 2/2012 | Yin | 370/252 |
| 8,135,421 B2* | 3/2012 | Furukawa et al. | 455/466 |
| 8,150,436 B2* | 4/2012 | Hattori | 455/514 |
| 8,233,403 B2* | 7/2012 | Yin | 370/252 |
| 8,244,511 B2* | 8/2012 | Yonezawa et al. | 703/13 |
| 8,385,908 B2* | 2/2013 | Ivarez Medina et al. | 455/423 |
| 2002/0002046 A1 | 1/2002 | Okanoue et al. | |

OTHER PUBLICATIONS

Takahiro Fujita, et al., "Accuracy Enhancement of Ray-Launching Radio Propagation Prediction by Measurement Data", Proceedings of the IEICE Conference Society Sep. 1, 2008, p. 4, vol. 2008.

"Radiowave Propagation Handbook", Realize Inc., 1999, pp. 203-210.

"Radiowave Propagation Handbook", Realize Inc., 1999, pp. 234-243.

"Details of Land Usage Classification, and Its Classification Code Correspondence Table", Digital Map 5000 (Land Usage)by the General Information Authority of Japan (formally, the Geographical Survey Institute), http://www.gsi.co.jp/MAP/CD-ROM/Iu5000/index.html, http://www.gsi.co.jp/MAP/CD-ROM/data_files/code.htm.

* cited by examiner

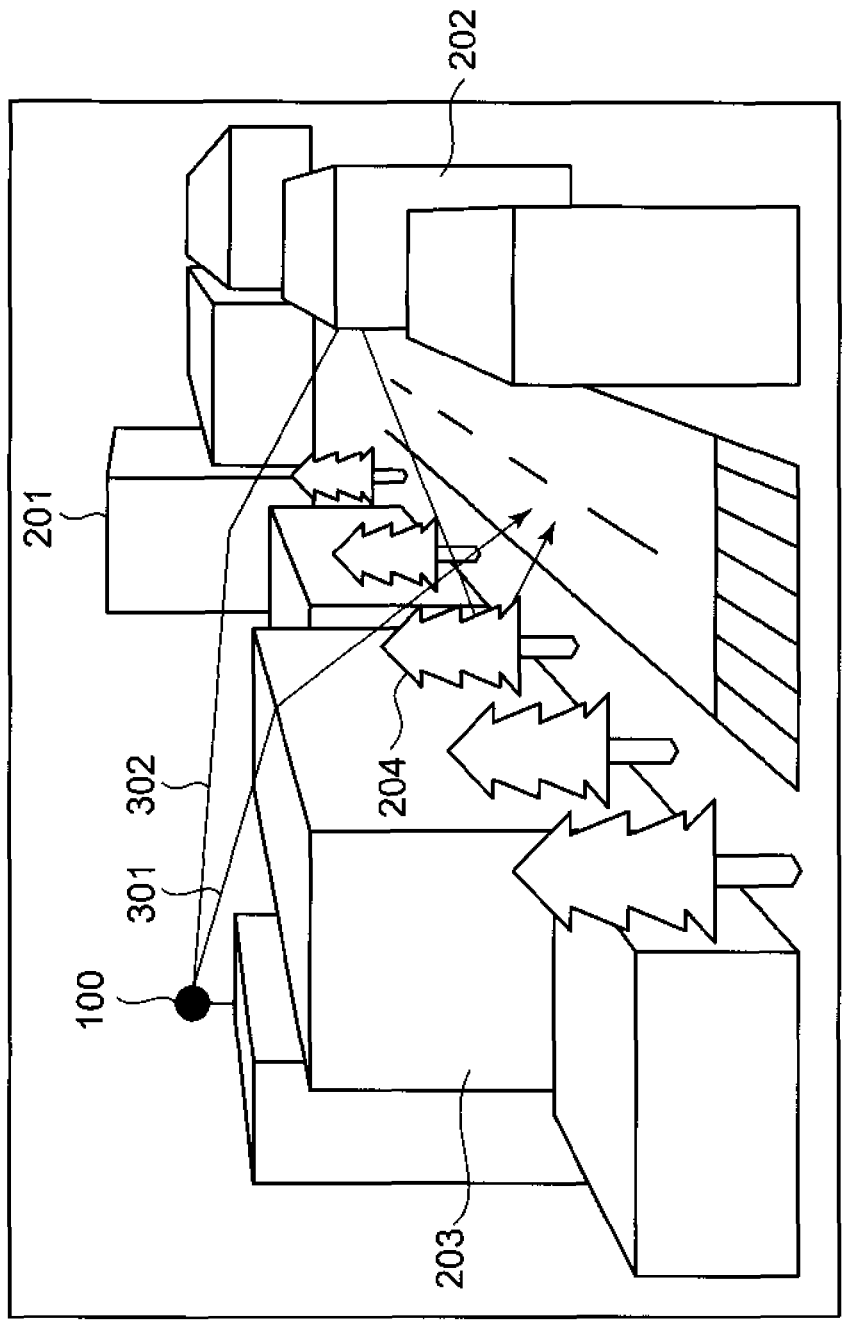

SYSTEM, METHOD, AND PROGRAM FOR CORRECTING RADIOWAVE ENVIRONMENT DATA

CROSS REFERENCE TO RELATED APPLICATIONS

This application is a National Stage of International Application No. PCT/JP2009/006625 filed Dec. 4, 2009, claiming priority based on Japanese Patent Application No. 2008-313261, filed Dec. 9, 2008, the contents of all of which are incorporated herein by reference in their entirety.

TECHNICAL FIELD

The present invention relates generally to systems, methods, and programs for correcting radiowave environment data obtained in a peripheral area of a base station of a wireless communications system. More particularly, the invention is directed to a system, method, and program for correcting radiowave environment data using data measurement results obtained at a limited number of measuring points in the area.

BACKGROUND ART

To appropriately design a service area for such a wireless communications system as a cellular phone network system or wireless LAN system, it is necessary to properly understand the radiowave environment characteristics obtainable when a base station to be designed (inclusive of access points in the wireless LAN system as well as the base station in the cellular phone network system) is installed at a specified location and with specified parameters. A radiowave propagation simulator is used to achieve the above. The appropriate service area can be designed by determining the installation location and parameters for the base station while assessing the signal-receiving electric field strength, delay spread, and other factors observable at any observing point using the radiowave propagation simulator.

Roughly speaking, radiowave propagation simulation employs a statistical method or a deterministic method. The statistical method gives a propagation loss estimating formula with the distance from a base station to a specified location, a frequency, and other values, as arguments, and empirically imparts parameters based on large volumes of actually measured propagation loss data, to the estimating formula. The average situation of terrestrial objects around a transmitting point or a receiving point can also be used to correct estimated data. The average situation of terrestrial objects refers to, for example, a building area occupancy ratio or average building height. Examples of the statistical method include the Okamura-Hata model, the Sakagami model, etc. Details of the Okamura-Hata model and the Sakagami model are disclosed in Non-Patent Document 1.

In contrast, the deterministic method allows for incorporating any impacts of peripheral objects faithfully when estimating the status of the radiowave propagation ranging from the transmitting point to the observing point. For example, if the deterministic method is used to estimate the status of the radiowave propagation originating from a base station disposed outdoors, the buildings, terrains, and other objects affecting the radiowave propagation are modeled using building map data and altitude map data and the radiowave propagation status is estimated while faithfully considering the impacts of the objects, such as reflection, transmission, and the like. Examples of a deterministic method include methods such as ray tracing. Ray tracing is a method of calculating propagation losses and the amounts of delay, by looking upon antenna-radiated radio waves as a cluster of radio rays, regarding each of the rays as propagating while repeating reflection and transmission in geometric-optical fashion, and combining the rays reaching the observing point.

The radiowave environment data to be given by radiowave propagation simulation, however, will contain estimation errors concerning the radiowave environment data obtained by actual installation of the base station under the same conditions as those of simulation. In the statistical method, for example, a statistical formula that has been empirically derived in a certain environment is applied to that of another environment to allow for the impacts of surrounding objects upon the radio wave, so the environmental differences may cause significant estimation errors. In the deterministic method, although the impacts of the objects are allowed for deterministically and can therefore be estimated more accurately than in the statistical method, estimation errors will also occur if the building map data or layout data used as object information is erroneous.

A method for correcting estimated radiowave environment data using the data actually measured at a limited area (e.g., on a trunk road) in an area surrounding a base station is disclosed as a method for reducing the estimation errors mentioned above. Patent Document 1, for example, discloses a method for simulating a radiowave propagation status by storing measured data on desired-wave receiving electric power, then calculating separate correction values for each of specified directions of a propagation curve based upon a statistical method, from any differences between the measured data and the propagation curve, next using the calculated correction values to correct the propagation curve, and finally, using the corrected propagation curve. For example, the Okamura-Hata model is used as the propagation curve. In addition, a building area occupancy ratio, for example, is corrected to correct the propagation curve. A correction value for the building area occupancy ratio is calculated for each specified angle (e.g., every two degrees) in all directions around the wireless base station, and is intended to simulate the propagation status of radio waves for each specified angle using the corrected propagation curve.

Another method for correcting estimated radiowave environment data using measured data is disclosed in Patent Document 2. In the method of Patent Document 2, differences between the propagation losses that have been measured at a plurality of points, and the propagation losses that have been arithmetically estimated using a propagation model, are calculated and virtual height values for each terrestrial object are adjusted so that the differences are decreased. The virtual height is one of the functions given in the radiowave propagation simulator "NetPlan" (registered trademark) developed by the applicant of Patent Document 2, and means the virtual height assumed for each object feature present on the earth surface.

The methods disclosed in Patent Documents 1 and 2 differ in that whereas one corrects a building area occupancy ratio, the other corrects virtual height. However, both methods are intended to perform corrections upon the area around the base station that corresponds to the direction in which measured data exists. As a result, radiowave environment data that incorporates the corrections is given to the area of the same direction as that in which the measured data exists.

CITATION LIST

Patent Literature

Patent Document 1 JP-A-2004-31100
Patent Document 2 JP-A-2005-229453

Non-Patent Literature

Non-Patent Document 1 "Radiowave Propagation Handbook" (Japanese-language version) published by Realize Inc. (editor: Yoshio Hosoya), pp. 203-210, 1999
Non-Patent Document 2 "Radiowave Propagation Handbook" (Japanese-language version) published by Realize Inc. (editor: Yoshio Hosoya), pp. 234-243, 1999

SUMMARY OF INVENTION

Technical Problem

The methods disclosed in Patent Documents 1 and 2 are effective for a case in which a similar estimation error relating to propagation occurs in the area of the same direction around the base station. Suppose, for example, that when measured electric field strength and estimated electric field strength are compared, the former is about 10 dB higher than the latter anywhere in the area of a certain direction from the base station. In such a case, provided that the electric field strength has been measured at a point in the area, accuracy can be improved over the entire measuring area by conducting corrections based upon the difference from the estimated electric field strength at the measuring point.

Conversely, suppose that in the area of another direction from the base station, the measured electric field strength, although 10 dB higher at point A than the estimated electric field strength, is 5 dB lower at point B. Under this situation, if the measurement for correction has only taken place at point A, a more significant error will occur at point B since propagation data will be corrected in a direction opposite to that of the measured value.

As a matter of fact, such a situation tends to easily happen in built-up cities and indoor areas having a complex arrangement of objects. In other words, similar estimation errors relating to propagation do not always occur in the area of the same direction around the base station. Rather, similar errors are more liable to occur at the outdoor areas falling under the same land usage division, such as roads, or in the indoor areas falling under the same indoor space usage division, such as corridors/hallways and rooms.

The land usage division or indoor space usage division as mentioned above is called the area usage division here. The reason why the errors as described above tend to occur is described below with reference to FIG. 21. FIG. 21 illustrates a partial propagation status of the radiowave components radiated from a transmitting point 100. For example, the radiowave component 301 radiated from the transmitting point 100 first collides against a building 201 to reflect thereat. Next, the radiowave component 301 collides against a building 202 first and then a building 203, to reflect at both, and finally, propagates through a road 400. In cities, roads function as a waveguide for radio waves, and the radio waves, as with the radiowave component 301 in the example, are usually transmitted along the roads. During propagation estimation based on ray tracing, if the building 201 is absent in building map data, the radiowave component 301 will be estimated not to propagate to the road 400. Thus, the signal-receiving electric field strength estimated on the road 400 will be uniformly lower than the strength actually measured.

Such a status also occurs with indoor radiowave propagation. That is, corridors/hallways and rooms act similarly to a radio waveguide, whereby a uniform estimation error comes to easily occur at the same corridors/hallways and in the same rooms.

The radiowave component 302 radiated from the transmitting point 100 becomes diffracted at an edge of the building 203, and after transmitting a street tree 204, reaches the road 400. Since building map data usually contains no information on street trees, transmission loss due to the presence of street trees is not considered and receiving electric field strength tends to be correspondingly estimated at a trifle high level. In cities, because of street trees being uniformly present on roads, as in the example of FIG. 21, the signal-receiving electric field strength estimated on the road will be uniformly higher than the strength actually measured.

Because of these characteristics, the conventional methods for correcting radiowave environment data have had their limits as far as urban or indoor radiowave environment data correction is concerned. This has made it necessary to measure correction data at a number of points in a peripheral area of a base station, and has thus required a very large number of measuring man-hours.

Accordingly, the present invention has been made in order to solve the above-discussed problems, and an object of the invention is to achieve accurate correction of radiowave environment data, based on measured data, at a limited number of measuring points in a base station peripheral area of a wireless communications system.

Solution to Problem

A radiowave environment data correcting system according to the present invention is characterized in that comprising correction data determining means that determines correction data for correcting radiowave environment data for sub-areas, the sub-areas being regions into which a peripheral area (assessment area) of a base station provided for a wireless communications system is divided, on the basis of data measurement results obtained at measuring points belonging to the sub-areas, wherein the radiowave environment data is information that indicates radiowave environment characteristics in the peripheral area of the base station, and wherein division into the regions of the sub-areas is based on an area usage division that is a division predefined according to a particular layout of objects or spaces in the peripheral area of the base station.

A radiowave environment data correcting system according to the present invention is characterized in that is included the step of determining correction data for correcting radiowave environment data for sub-areas, the sub-areas being regions into which a peripheral area (assessment area) of a base station provided for a wireless communications system is divided, on the basis of data measurement results obtained at measuring points belonging to the sub-areas, wherein the radiowave environment data is information that indicates radiowave environment characteristics in the peripheral area of the base station, and wherein division into the regions of the sub-areas is based on an area usage division that is a division predefined according to a particular layout of objects or spaces in the peripheral area of the base station.

A radiowave environment data correcting program according to the present invention is characterized by making a computer perform: a process of determining correction data for correcting radiowave environment data for sub-areas, the sub-areas being regions into which a peripheral area (assessment area) of a base station provided for a wireless communications system is divided, on the basis of data measurement results obtained at measuring points belonging to the sub-areas, wherein the radiowave environment data is information that indicates radiowave environment characteristics in the peripheral area of the base station, and wherein division into the regions of the sub-areas is based on an area usage division that is a division predefined according to a particular layout of objects or spaces in the peripheral area of the base station.

Advantageous Effects of the Invention

According to the present invention, the number of measuring man-hours required for correction is reduced more significantly than that in conventional methods, and thus, more efficient designing of a service area for a wireless communications system is achieved.

BRIEF DESCRIPTION OF DRAWINGS

FIG. 21 It depicts a diagram for describing how a radiowave propagation estimating error occurs in an urban area.

DESCRIPTION OF EMBODIMENTS

First Exemplary Embodiment

Figure 1:
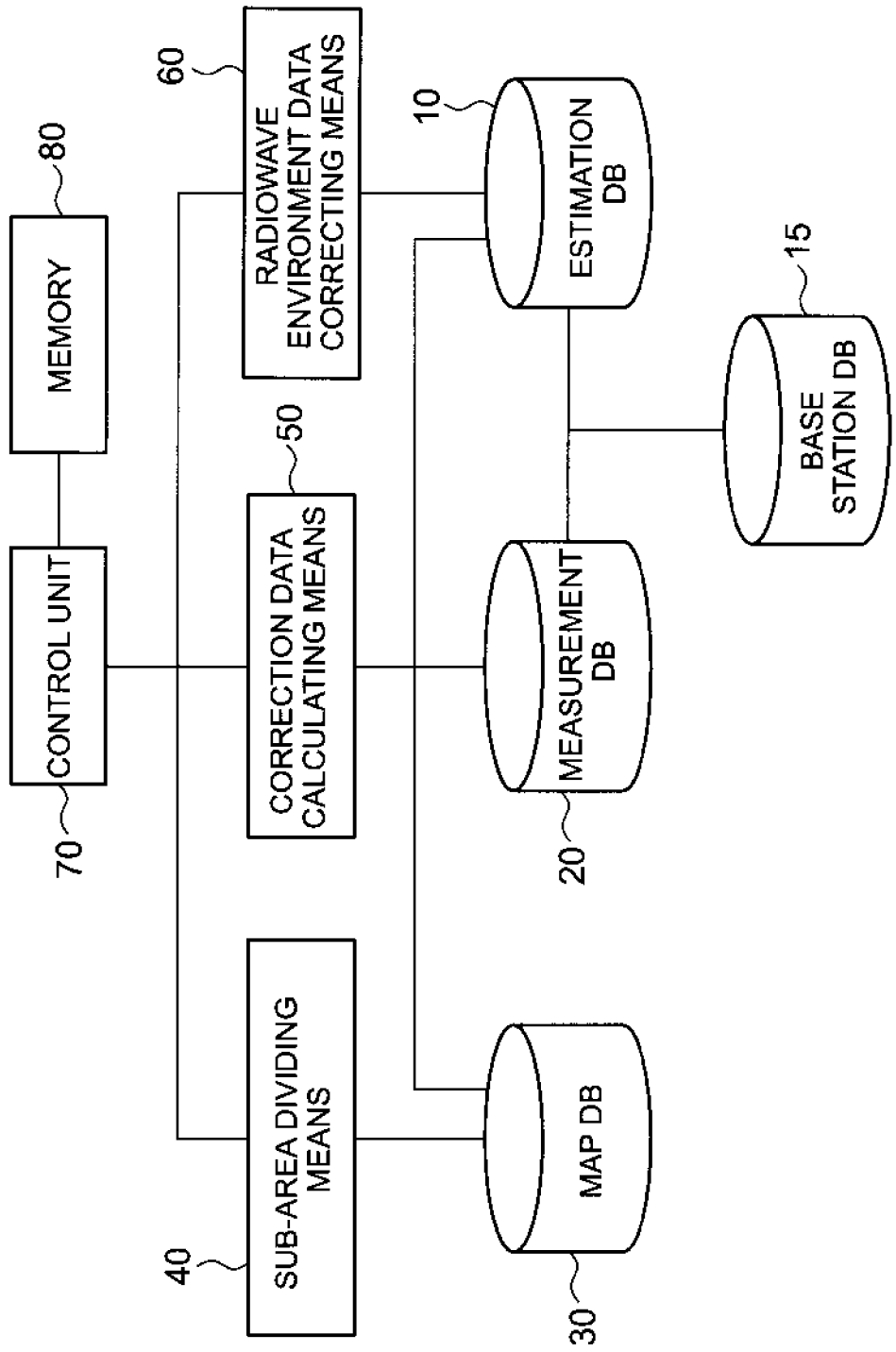
FIG. 1 It depicts a block diagram showing an example of a radiowave environment data correcting system configuration according to a first exemplary embodiment.

The best mode for carrying out the invention is described in detail below referring to the accompanying drawings. FIG. 1 is a block diagram showing an example of a radiowave environment data correcting system configuration according to a first exemplary embodiment. The radiowave environment data correcting system of the present exemplary embodiment includes an estimation database 10, a base station database 15, a measurement database 20, a map database 30, a sub-area dividing means 40, a correction data calculating means 50, a radiowave environment data correcting means 60, a control unit 70, and a memory 80.

The estimation database 10 (hereinafter, referred to as the estimation DB 10) includes a stored collection of uncorrected radiowave environment data and that of base station information. More specifically, the database includes data indicative of latitudes and longitudes (or XY coordinates) and altitudes (or heights above the ground) of various observing points discretized in a predetermined grid pattern (e.g., at 10-meter grid intervals), and other data indicative of radiowave environment characteristics, such as signal-receiving electric field strength from a neighboring base station, the signal-receiving electric field strength having been calculated by radiowave propagation simulation. The database further includes stored identification information on the base station which becomes a transmitting source of the signal-receiving electric field strength. The radiowave environment data itself may include a delay profile, an arrival direction of signals, and other data, as well as the signal-receiving electric field strength. In addition, a technique for implementing the radiowave propagation simulation described above is preferably ray tracing that has a reputation for simulation in the urban areas where the present invention functions particularly well.

The base station database 15 (hereinafter, referred to as the base station DB 15) is a stored collection of parameter information on base stations including the base station which becomes the transmitting source of the signal-receiving electric field strength stored in the estimation DB 10. More specifically, the database 15 also includes a stored collection of base station identification information and that of parameters such as latitudes and longitudes (or XY coordinates), altitudes (or heights above the ground), and transmission output values of layout positions, horizontal azimuth and vertical azimuth of an antenna, and gain pattern of the antenna.

The measurement database 20 (hereinafter, referred to as the measurement DB 20) is a stored collection of field-measured data. More specifically, the data stored as the database 20 includes latitudes and longitudes (or XY coordinates) and altitudes (or heights above the ground) of various measuring points, measured signal-receiving electric field strength, identification information on the base station which becomes the transmitting source of the signal-receiving electric field strength, and other data and information.

The map database 30 (hereinafter, referred to as the map DB 30) is a stored collection of map data that includes information (shapes, positions, etc.) of terrestrial objects such as buildings. The map data preferably contains shapes, positions, and other information on roads, and information on city blocks (ranges, types, positions, and more). More specifically, stored polygon data that represents the terrestrial objects, stored line data that represents the roads in terms of line segments, and/or stored polygon data that represents the city blocks may contain coordinate information.

The sub-area dividing means 40, the correction data calculating means 50, and the radiowave environment data correcting means 60 refer to execution modules or libraries for processing the data extracted from the estimation DB 10, the measurement DB 20, and the map DB 30. More specifically, the execution modules or libraries execute some kind of process after control by the control unit 70 to be described later herein. In the remainder hereof, for example if a certain kind of process is conducted by the sub-area dividing means 40, this indicates that the control unit 70 has controlled the sub-area dividing means 40 to execute the execution module or library of its corresponding section. Further details of the process are described later herein.

The control unit 70 is a CPU that controls operation of the sub-area dividing means 40, correction data calculating means 50, and radiowave environment data correcting means 60. The memory 80 functions as a work memory.

The estimation database 10, base station database 15, measurement database 20, and map database 30 in the present exemplary embodiment are realized by a database system including, for example, a storage device and a control device that controls access to the storage device. In addition, the sub-area dividing means 40, the correction data calculating means 50, the radiowave environment data correcting means 60, and the control unit 70 are realized by, for example, a program and a CPU that operates in accordance with the program. The memory 80 is realized by a storage device, for example.

Figure 2:
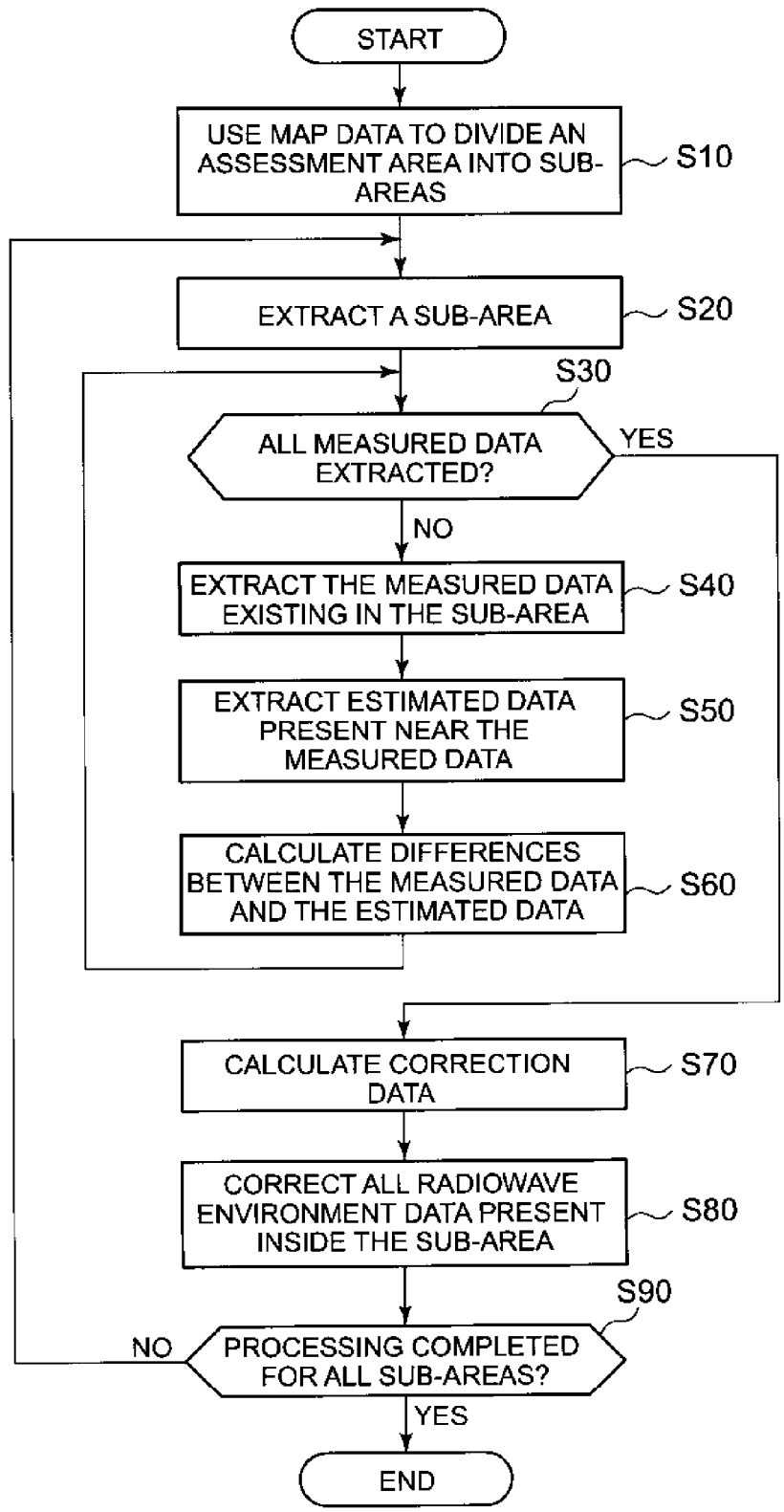
FIG. 2 It depicts a flowchart showing an operational example of the radiowave environment data correcting system according to the first exemplary embodiment.

FIG. 2 is a flowchart showing an operational example of the radiowave environment data correcting system according to the present exemplary embodiment. A technique for using the measured data within the measurement DB 20 and the map data within the map DB 30 to correct the signal-receiving electric field strength value in the estimation DB 10 is described below with reference to FIG. 2. The field strength in this example was obtained with a designated base station as a transmitting source in a limited (e.g., 2-km square) outdoor assessment area.

According to the first exemplary embodiment of the present invention, the map data in the assessment area, which is extracted from the map DB 30, is first used to divide the assessment area into sub-areas according to a land usage division that is a usage division of outdoor areas (step S10). The land usage division here represents in what way the land is used, and according to the land usage classification by the Geographical Survey Institute, land is classified as described in Non-Patent Document 3. In the DESCRIPTION of the present invention, land is classified at a more micro level as to be discussed later. More specifically, the division of areas that represents how the land is used according to a way in which the terrestrial objects and spaces (vacant lots, roads, etc.) in the land are present, that is, geographical characteristics, is used as the land usage division in the present invention. In other words, the land usage division in the invention is an outdoor application form of the area usage division predefined according to layout of the objects or spaces which affect radiowave propagation in the area.

Figure 3:
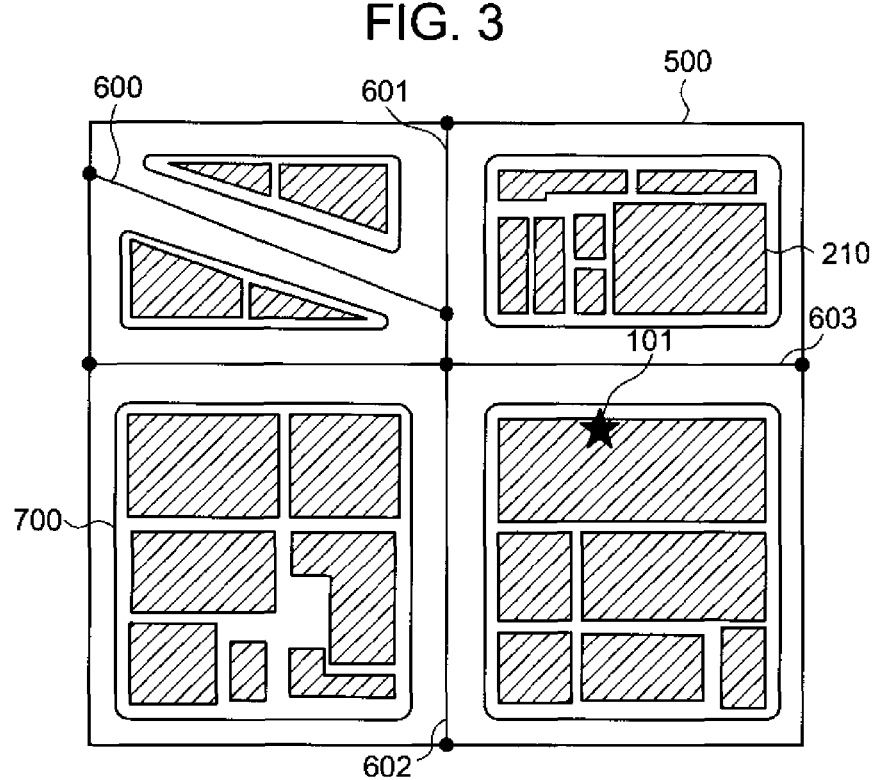
FIG. 3 It depicts an explanatory diagram showing an example of dividing an assessment area into sub-areas.

A detailed sequence of classifying the assessment area into sub-areas in accordance with the land usage division is described below by way of example with reference to FIG. 3. FIG. 3 contains such a terrestrial object (building) data as a building 210, such road data as a road 600, and such town block data as a town block 700, inside the assessment area 500. An asterisk denotes the base station 101 that becomes the transmitting source.

First, internal regions of terrestrial objects are defined as independent intra-terrestrial object sub-areas for each terrestrial object. In the example of FIG. 3, the region surrounded by the building 210 becomes an intra-feature sub-area 210. Next, regions external to terrestrial objects and internal to town blocks are defined as independent intra-block sub-areas for each town block. In the example of FIG. 3, the region existing externally to a building and surrounded by the town block 700 is defined as an intra-block sub-area 700.

Additionally, a region external to buildings or town blocks and present only on a specific road of all roads, and regions in contact with the region are defined as independent road sub-areas for each road. In the example of FIG. 3, the region external to buildings or town blocks and present only on the road 600 of all roads (i.e., a region present on line data), and regions in contact with the region (i.e., a region included according to particular width of the road) are defined as a road sub-area 600. For a region with two or more crossing roads, it suffices just to determine into which of the road sub-areas the region is divided. For example, the region may be divided so as to belong to a road sub-area associated with the closest line data. A plurality of road sub-areas that match one another at both end points of the road line data may be coupled to form one sub-area, if the roads lie within a predetermined differential angle range (e.g., 30 degrees). In the example of FIG. 3, road sub-areas 601 and 602 may be coupled to form one road sub-area.

Conversely, one road sub-area may be divided into a plurality of sub-areas, depending upon an azimuth or distance from the base station: In the example of FIG. 3, a road sub-area 603 may be divided into independent road sub-areas at eastern and western sides of the base station. Furthermore, a space within a range of 100 m from the base station may be defined as one road sub-area, and a space outside the range of 100 m, as another road sub-area.

The process of step S10 described above is executed by the sub-area dividing means 40.

Next, one of the sub-areas which have been formed by the division in step S10 is extracted (step S20). Whether all desired measured data in the measurement DB 20 will have been extracted by the time the sub-area was extracted is determined (step S30). The desired measured data here are data that satisfies at least two requirements. One requirement is that the data itself was measured at measuring points within the sub-area extracted in step S20, and the other requirement is that the base station that becomes the transmitting source of signal-receiving electric field strength should be a base station that is subjected to the present correction process. Processing jumps to step S70, if it is determined in step S30 that all desired measured data have been extracted. Conversely if it is determined in step S30 that not all desired measured data have been extracted, part of the measured data to be extracted is extracted from the measurement DB 20 (step S40).

Next, an observing point near the measuring points which were extracted in step S40 is extracted and then data estimated at the observing point is extracted (step S50). Additionally, if the measured altitude (or above-ground height) data extracted in step S40 and the estimated altitude (or above-ground height) data extracted in step S50 are the same or close (e.g., within a difference of 1 m), a difference between the two signal-receiving electric field strength levels is calculated (step S60).

In step S50, one observing point closest to the measuring points extracted in step S40 may be extracted or a plurality of observing points within a predetermined distance (e.g., 30 m) from one of the measuring points extracted in step S40 may be extracted. In the latter case, since a plurality of differences are calculated in step S60, averaging is executed and one difference is calculated for one set of measured data. The value thus obtained may be that obtained by simply averaging the differences, or since higher priority is assigned to observing points closer to the measuring points, the value may be an average value obtained by weighting with a reciprocal of the distance between the measuring point and the observing point. After step S60, processing returns to the determination in step S30.

If all desired measured data are already extracted in step S30, the difference that was calculated in step S50 is used to calculate a correction value for the sub-area (step S70). Alternatively, the correction value may be calculated by simple averaging of the plurality of differences calculated in step S50.

As a further alternative, if groups of measured data exist at remote positions in the sub-area, this sub-area may be divided into a plurality of sub-areas and a specific correction value may be assigned to each sub-area. Such an example is described below with reference to FIG. 4.

Figure 4:
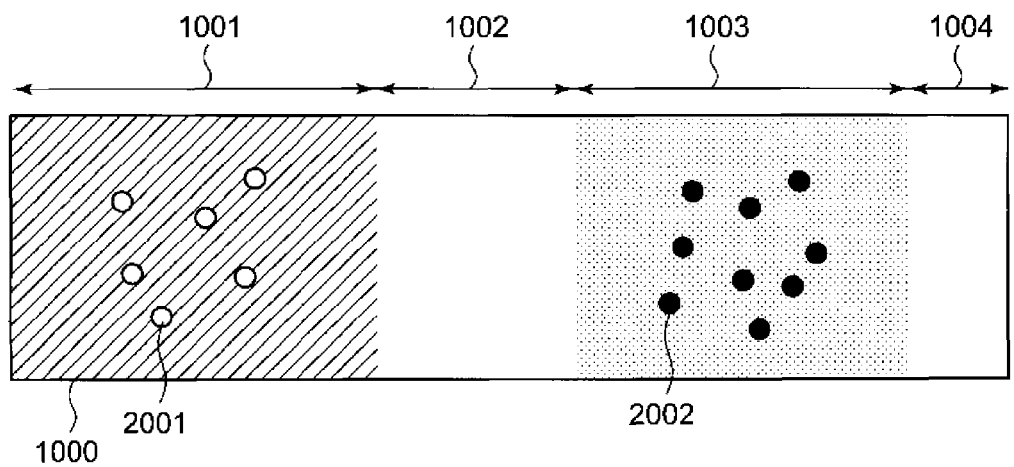
FIG. 4 It depicts an explanatory diagram showing an example of subdividing one sub-area according to a particular distribution of measured data.

FIG. 4 shows an example in which measured data group A (shown as white circles), inclusive of measured data 2001, and measured data group B (shown as black circles), inclusive of measured data 2002, are present at remote positions in a sub-area 1000.

In this example, a neighboring area of measured data group A, for example an area located within a predetermined distance of 100 m, for example, from a gravitational position of the measured data group, is defined as a sub-area 1001, and a correction value for the sub-area is calculated based on the difference in the measured data in the measured data group A. In contrast, a neighboring area of measured data group B is defined as a sub-area 1003, and a correction value for the sub-area is calculated based on the difference in the measured data in the measured data group B. In these cases, the differences that have been calculated at the plurality of measuring points may be simply averaged.

An area located in neither of measured data groups A and B is defined as a sub-area 1002 or 1004, and correction values for these sub-areas are calculated from those of the sub-areas 1001 and 1003. More specifically, the sub-area 1002 may use a value obtained by simply averaging the two corresponding correction values, or use an average value obtained by calculating a distance from a gravitational position of the sub-area 1002 to that of the sub-area 1001, 1003, and then conducting a weighting operation with a reciprocal of the distance.

The processes of above steps S20 to S70 are executed by the correction data calculating means 50.

Figure 5:
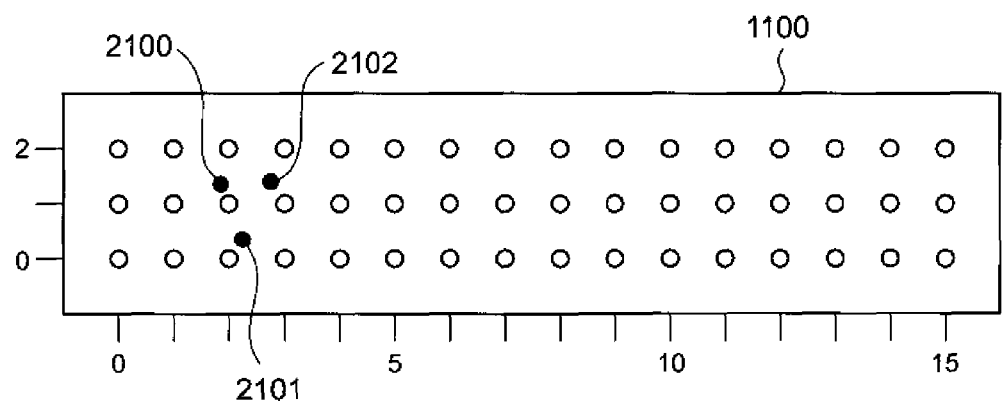
FIG. 5 It depicts an explanatory diagram for describing a correcting method relating to internal observing points of the sub-area.

Furthermore, the signal-receiving electric field strength that has been estimated for all observing points in the sub-area is corrected (step S80). A detailed correcting method is described below with reference to FIG. 5. FIG. 5 is an explanatory diagram for describing a correcting method relating to the internal observing points of the sub-area. The example of FIG. 5 applies to a case in which 48 observing points (white circles) in addition to such measured data (black circles) as measured data 2100 are present in a sub-area 1100.

In this example, each observing point is provided with an X-coordinate and a Y-coordinate to identify the observing point. In a further detailed correcting method, the correction value that was calculated in step S70 may be assigned to all observing points in the sub-area. Alternatively, the correction value may be adjusted according to a particular differential distance (including a vertical clearance) between a position of one observing point and that of the measuring point; if the distance is short, the correction value may be applied intact, or as the distance increases, the correction value may be reduced.

In FIG. 5, if the correction value is 10 dB, this correction value of 10 dB is applied intact for all observing points ranging between 0 and 5 in X-coordinate, and as the X-coordinate increases, the 10-dB correction value is corrected to approach 0 dB, for other observing points equal to or greater than 6 in X-coordinate. Another alternative method may be to give a correction value only to the observing points that are located at a predetermined distance (e.g., 10 m) or more from the measuring point in the sub-area, and for other observing points neighboring the measuring point, since measured data is known, the measured signal-receiving electric field strength may be used intact as estimated signal-receiving electric field strength.

In the example of FIG. 5, the signal-receiving electric field strength of the measured data 2100 is applied to the observing point of (X, Y)=(2, 1), that of the measured data 2101 to the observing point of (X, Y)=(3, 0), and that of the measured data 2102 to the observing point of (X, Y)=(4, 1). For other observing points, a correction value is given using the first or second method described above.

In contrast, if a correction value is not calculated because of no measured data being present in the sub-area, a correction value for the intended sub-area is calculated from that of a neighboring sub-area. The correction value for a sub-area falling under the same land usage division as that of the intended sub-area, and having the gravitational position closest to that of the intended sub-area, may be directly used during the above calculation. An alternative to this method may be to use the correction value for a sub-area falling under the same land usage division as that of the intended sub-area, and having the gravitational position closest to that of the intended sub-area, and a correction value for another sub-area having the gravitational position second closest to that of the intended sub-area, and use, as the correction value, an average value obtained for the intended sub-area by weighting with a reciprocal of a distance between the two sub-areas mentioned above.

In this phase, whether the processes of steps S30 to S80 have been completed for all sub-areas is determined (step S90). If the processes have not been completed for all sub-areas, the process is returned to step S20, in which step, all sub-areas remaining unprocessed are extracted and the processes of steps S30 to S80 are conducted. If, in step S90, the processes for all sub-areas are determined to have been completed, the correction process comes to an end.

The processes of steps S80 and S90 described above are conducted by the radiowave environment data correcting means 60.

The exemplary embodiment in which the estimated data, the measured data, and the map data are all stored in a database format, has been described above. Part or all of the three kinds of data, however, may be stored in a non-database format, such as a file.

Figure 6:
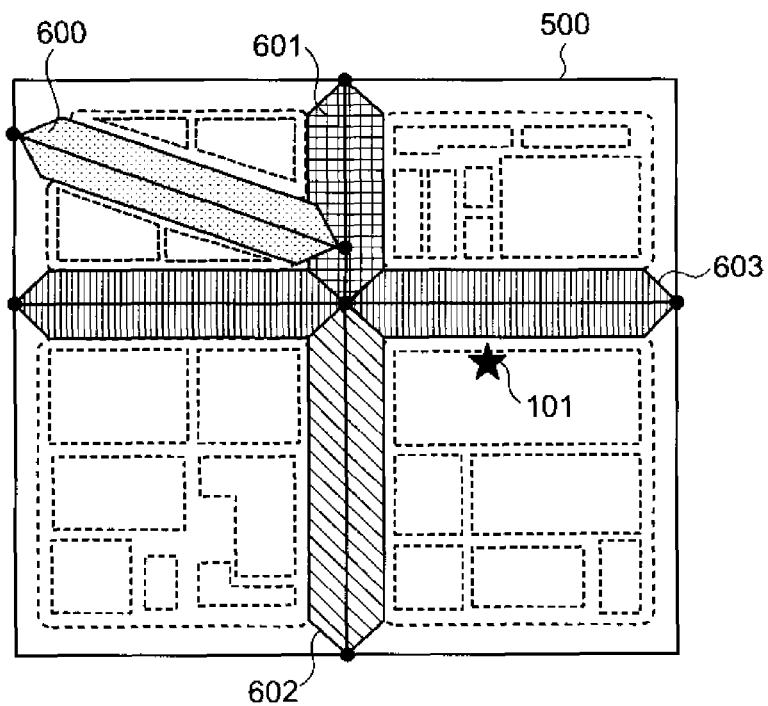
FIG. 6 It depicts an explanatory diagram for describing a method of division into road sub-areas.

Non-Patent Document 3: Digital Map 5000 (Land Usage) by the Geospatial Information Authority of Japan (formerly, the Geographical Survey Institute), "Details of Land Usage Classification, and Its Classification Code Correspondence Table", http://www.gsi.go.jp/MAP/CD-ROM/lu5000/index.html, http://www.gsi.go.jp/MAP/CD-ROM/lu5000/data_files/code.htm A method of defining regions external to a building or town block and positioned only in specific ones of all road regions, as independent road sub-areas for each road, has been presented above as an example of division into road sub-areas. However, this method may be implemented, for example, by the calculation to be described below. First, the sub-area dividing means 40 calculates a distance (dn) from an assessment point provided in the assessment area, to a road "n". The distance from the assessment point to the road is a minimal distance from the assessment point to a point on a line segment of the road. The calculation of this distance is conducted upon all roads to extract a road (m) that minimizes the distance. Additionally, the extraction of this road may be conducted upon all assessment points to divide the region into road sub-areas. That is, regions formed by aggregating all assessment points for each extracted road may be defined as road sub-areas. FIG. 6 is an explanatory diagram showing an example of applying this method to the assessment area 500 shown in FIG. 3. In the example of FIG. 6, the corresponding region is divided into such road sub-areas 600, 601, 602, 603 as distinctly shown by hatching or shading.

Figures 7, 8:
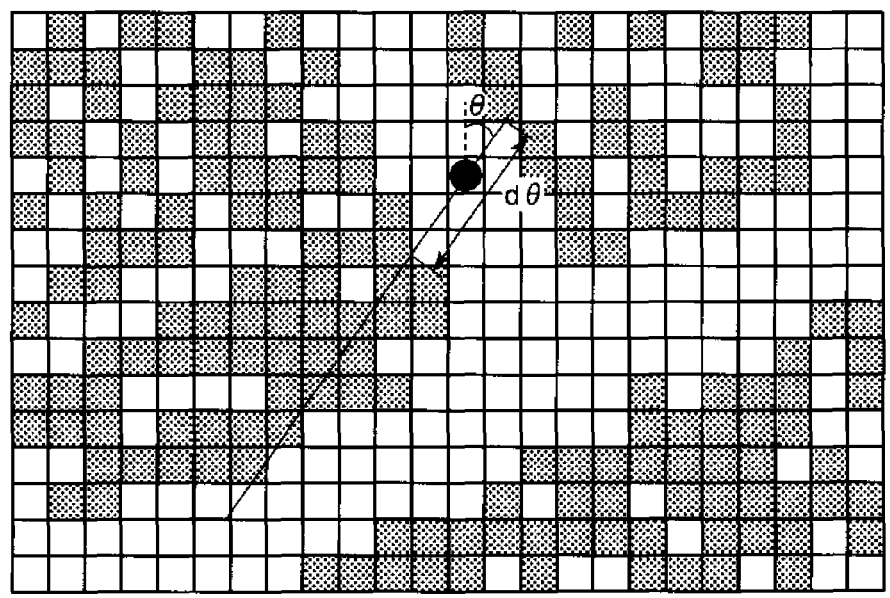
FIG. 7 It depicts an explanatory diagram for describing a second method of division.
FIG. 8 It depicts another explanatory diagram for describing the second method of division.

Division into road sub-areas is likewise realizable by using the method to be described below. This method, hereinafter referred to as the second dividing method, is also effective for a case in which no road line data exists. FIGS. 7 to 10 are explanatory diagrams for describing the second dividing method. In FIGS. 7 and 8, indoor observing points are shaded on a grid to distinguish each from outdoor observing points. First, as shown by way of example in FIG. 7, a straight line of angle θ is drawn for certain outdoor observing point A, with true north as an axis. Next, an indoor/outdoor region discrimination is conducted at the observing point near the straight line determined by following formula (1), and a distance (dθ) of a region range which continuously becomes outdoor from observing point A is calculated. Coordinates of observing point A in the assessment area are shown as $(x_a, y_a)$ in formula (1):

[Numerical expression 1]

(a) If $0 \leq \theta_{max} < \pi/4$, $3\pi/4 < \theta_{max} < \pi$, $(\text{round}[x_{a+n}], y_{a+n}) = (\text{round}[x_a + \tan \theta(y_{a+n} - y_a)], y_{a+n})$ (b) If $\pi \leq \theta_{max} \leq 3\pi/4$, $(x_{a+n}, \text{round}[y_{a+n}]) = (x_{a+n}, \text{round}[y_a + (1/\tan \theta)(x_{a+n} - x_a)])$    Formula (1)

Next, a maximum positive value "$n_{max}$" of the region which continuously becomes outdoor from observing point A, and a minimum negative value "$n_{min}$" of the region which continuously becomes outdoor from observing point A are calculated and then the distance (dθ) is calculated by formula (2).

[Numerical expression 2]

$d_\theta = \sqrt{(x_{a+n_{max}} - x_{a+n_{min}})^2 + (y_{a+n_{max}} - y_{a+n_{min}})^2}$    Formula (2)

After this, the angle θ is varied at fixed intervals of α (e.g., α=π/18[rad]=10 degrees) and the distance ($d_\theta$) at each of the angle positions is calculated to obtain $\theta_{max}$, an angle value of θ that maximizes $d_\theta$. This angle is defined as a road angle. The road angle ($\theta_{max}$) is calculated for all outdoor observing points using the above method.

Figure 9:
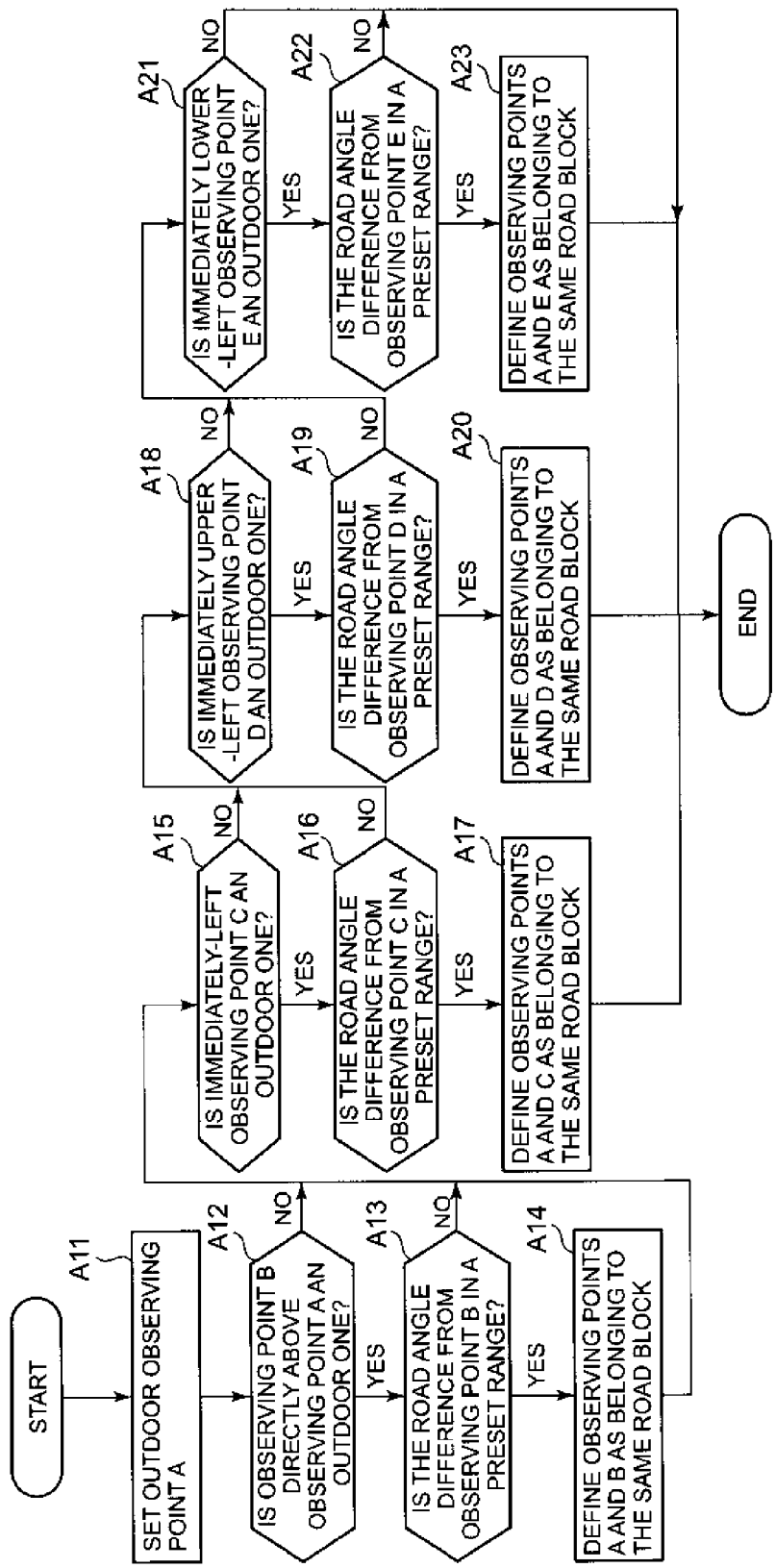
FIG. 9 It depicts a flowchart for describing the second method of division.

Next, outdoor observing points are sequentially searched for and a road block is determined. FIG. 8 is an explanatory diagram showing an example of search sequence of outdoor observing points in the second dividing method. FIG. 9 is a flowchart showing an example of procedural steps relating to division into road sub-areas at outdoor observing point A in the second dividing method. As shown in FIG. 9, first, outdoor observing point A to undergo processing is set in accordance with the search sequence of FIG. 8 (step A11). If observing point B directly above outdoor observing point A is an outdoor observing point and a difference between the road angle at observing point A and the road angle at observing point B is within β (e.g., α=π/18[rad]=10 degrees), observing points A and B are defined as belonging to the same road block (steps A12 to A14).

In addition, if observing point C located directly to the left of outdoor observing point A to undergo processing is an outdoor observing point and a difference between the road angle at observing point A and the road angle at observing point C is within β (e.g., α=π/18[rad]=10 degrees), observing points A and C are defined as belonging to the same road block (steps A15 to A17).

However, if observing points A and C are not defined as belonging to the same road block above, a determination similar to the above is next conducted for observing point D located directly to the upper left of outdoor observing point A to undergo processing. That is, if observing point D is an outdoor observing point and a difference between the road angle at observing point A and the road angle at observing point D is within β (e.g., α=π/18[rad]=10 degrees), observing points A and D are defined as belonging to the same road block (steps A18 to A20).

However, if observing points A and D are not defined as belonging to the same road block above, a determination similar to the above is next conducted for observing point E located directly to the lower left of outdoor observing point A to undergo processing. That is, if observing point E is an outdoor observing point and a difference between the road angle at observing point A and the road angle at observing point E is within β (e.g., α=π/18[rad]=10 degrees), observing points A and E are defined as belonging to the same road block (steps A21 to A23).

If observing points different for each road are defined as belonging to the same road block, the road angle in the combined road block may be set as an average value of the road angles at the observing points which are members of the road block.

Figure 10A:
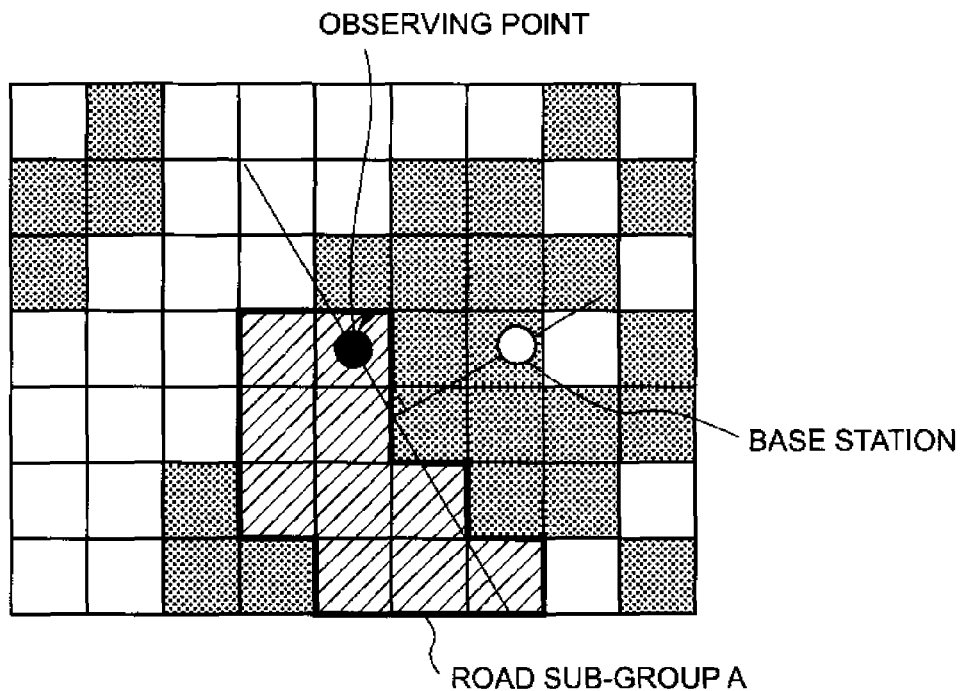
FIGS. 10A and 10B depict yet another explanatory diagrams for describing the second method of division.
Figure 10B:
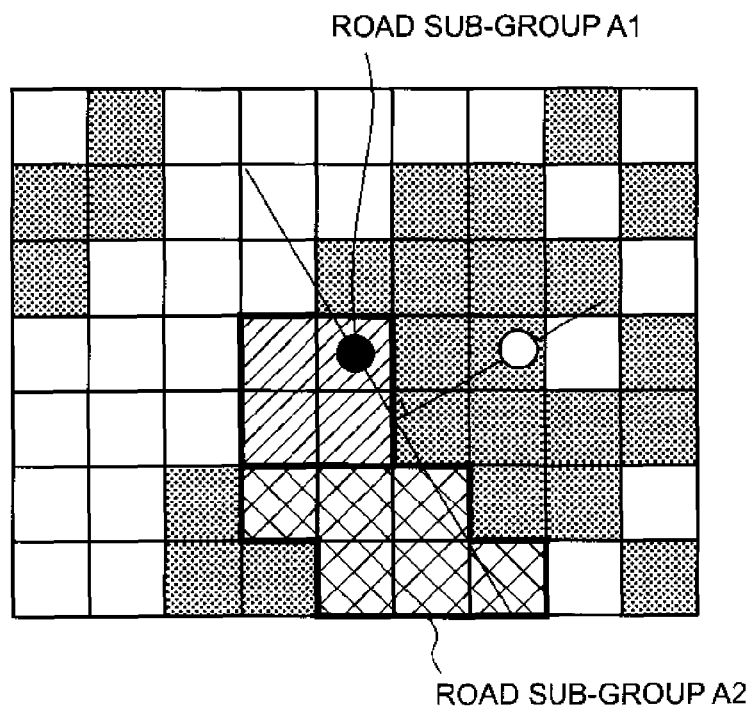

Additionally, road blocks that have been determined to be the same road block may each be subdivided according to a particular relationship in position between the base station and the observing point. FIGS. 10A and 10B are explanatory diagrams showing an example of dividing a road block into two segments according to a particular positional relationship of the road block with respect to a base station. FIG. 10A is an explanatory diagram showing an example of an undivided road block. FIG. 10B is an explanatory diagram showing an example of dividing the road block of FIG. 10A into two segments. For example, as shown in FIG. 10A, one road block may be divided by checking a relationship in position between, for example, an observing point (black circle) determined to exist on the same road block, and a crossing point of a road line and a perpendicular line drawn downward from the base station (white circle) to the road line, and determining the resultingly displayed positional relationship using determination formula (3) as shown below. In determination formula (3), coordinates of the base station in the assessment area are shown as $(x_b, y_b)$, and those of the observing point as $(x_a, y_a)$.

(a) If $0 \leq \theta_{max} < \pi/4$, $3\pi/4 < \theta_{max} \leq \pi$, [Numerical expression 3]

division is based on whether "$y_a$" is greater or smaller than $$\frac{y_b + y_a \tan^2 \theta_{max} - (x_a - x_b) \tan \theta_{max}}{1 + \tan^2 \theta_{max}}$$

(b) If $\pi \leq \pi \theta_{max} \leq 3\pi/4$, division is based on whether "$x_a$" is greater or smaller than $$\frac{x_a + x_b \tan^2 \theta_{max} - (y_a - y_b) \tan \theta_{max}}{1 + \tan^2 \theta_{max}} \quad \text{Formula (3)}$$

Through above processing, the regions formed by aggregating all observing points that have been determined to belong to the same road block may be defined as road sub-areas. An example of dividing road sub-group A into road sub-groups A1 and A2 is shown in FIG. 10B.

Figure 11:
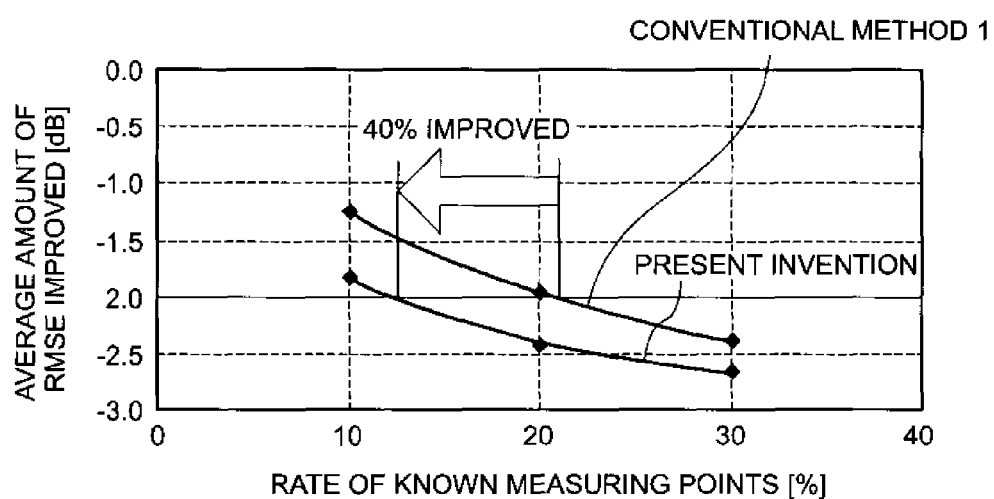
FIG. 11 It depicts an explanatory diagram that shows simulation results in comparison with those obtained in a conventional method.
Figure 12A:
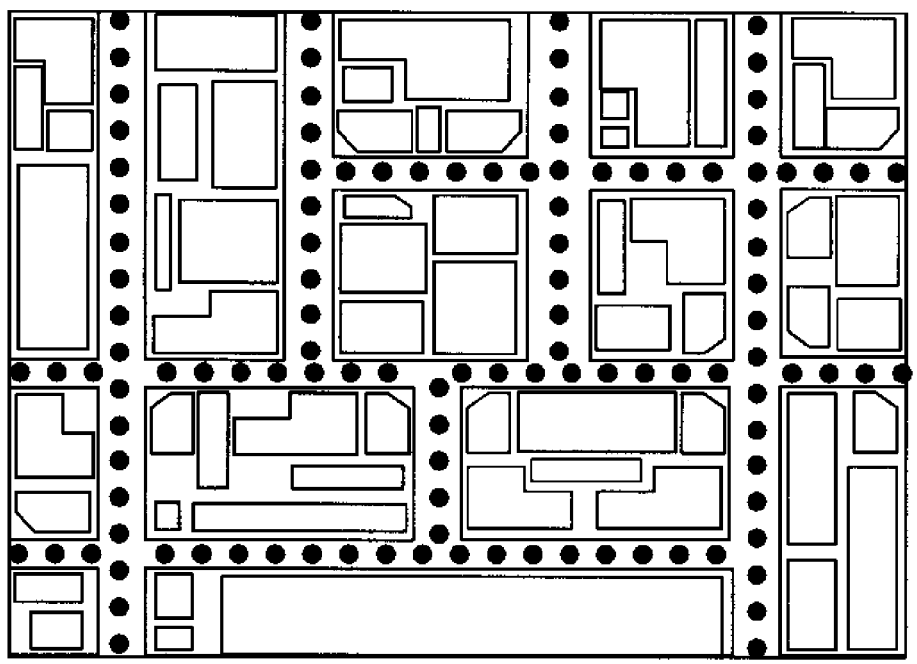
FIGS. 12A and 12B depict explanatory diagrams showing an example of known measuring points and unknown ones in the intended area.
Figure 12B:
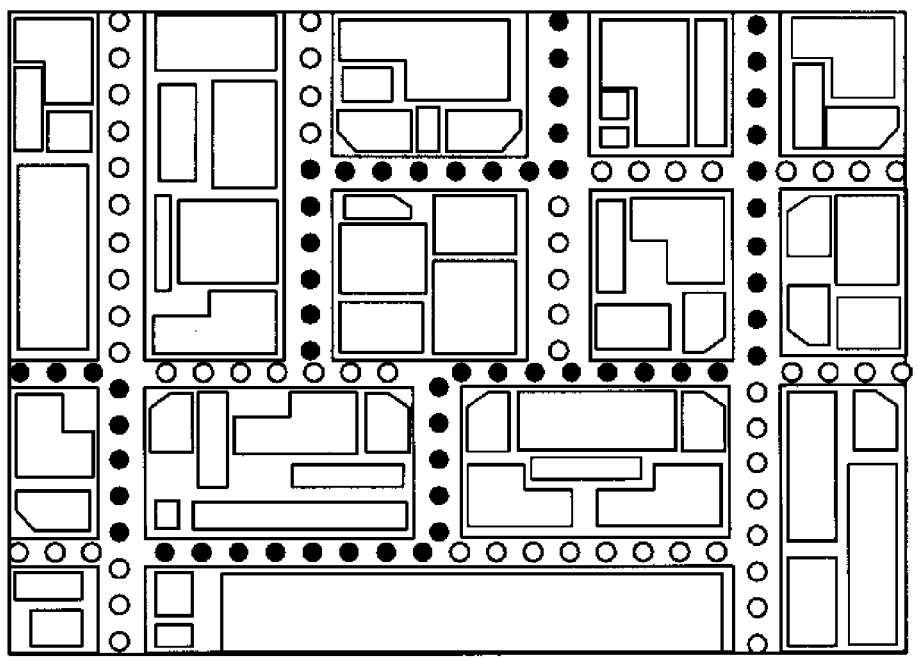

FIG. 11 is an explanatory diagram that shows simulation results on application of the radiowave environment data correcting method according to the present invention, the simulation results being compared with those obtained in a conventional method. FIG. 11 shows assessment results that represent to what extent a root-mean-square error (RMSE) is improved when the radiowave propagation estimation based on the ray-tracing method is corrected using measured data. These assessments were conducted in an urban area. In FIG. 11, a rate of known measuring points, plotted on a horizontal axis, means a rate of the known measured data that were used for the correction, to the data that was measured on all roads exceeding a width of 5 m in the intended area. FIG. 12A shows an example in which the data measured on all the roads was used for the correction. Round markings in FIGS. 12A and 12B denote data-measuring points. Black circles of the markings denote known measuring points, the points at which the data obtained at the measuring points is used for the correction, and white circles denote unknown measuring points, the points at which the data obtained at the measuring points is not used for the correction. FIGS. 12A and 12B are explanatory diagrams showing an example of known measuring points and unknown ones in the intended area.

For example, if the measured data at the measuring points shown in FIG. 12A is all used for the correction, the rate of the known measuring points is 100%. However, if the measured data at half of all measuring points is used for the correction, the rate of the known measuring points is 50%.

An average amount of RMSE improved when the measured correction data is extracted in various patterns with respect to a defined rate of the known measuring points is plotted on a vertical axis in FIG. 11. FIG. 11 indicates that at an RMSE improvement level requirement of −2 dB, for example, a conventional correction method based on the azimuth relative to the base station (hereinafter, this method is referred to as conventional method 1) has required about 21% of measured data to be used for correction, whereas the method according to the present invention has reduced this rate to 12%. This means that according to the present invention, since the amount of measured data to be used for the correction can be reduced by 40% in comparison with that in conventional method 1, the number of man-hours required for measurement can be correspondingly reduced.

In addition, while an example of a correcting method relating to the signal-receiving electric field strength as radiowave environment data is described in the above exemplary embodiment, similar processing can also be conducted upon a propagation loss, signal-to-noise ratio (SNR), signal-to-interference ratio (SIR), and other parameters calculable from the signal-receiving electric field strength.

Figure 13:
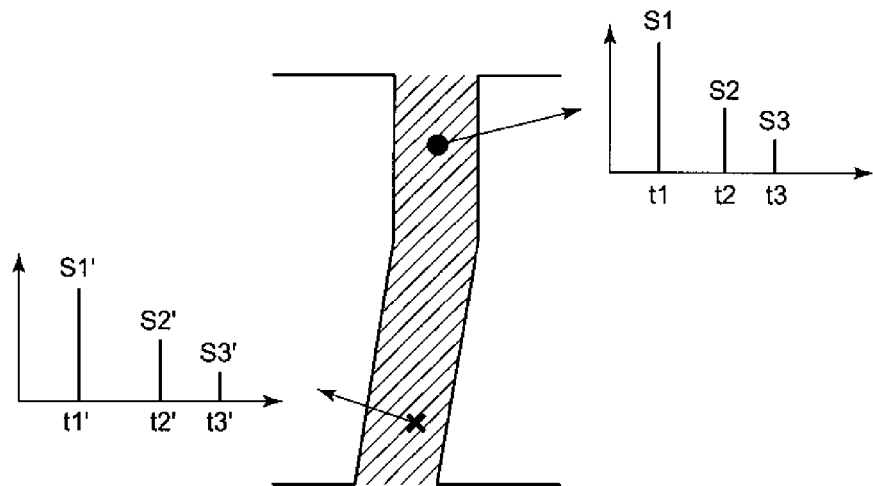
FIG. 13 It depicts an explanatory diagram showing an example of a method for correcting delay profiles.

For example, delay profiles can also be corrected if any estimated data on the delay profiles exists in such cases as using ray tracing to calculate the estimated data. FIG. 13 is an explanatory diagram showing an example of a method for correcting delay profiles. Suppose that as shown in FIG. 13, a measuring point (marked with a black circle in FIG. 13) exists on a certain road block and the profile at the measuring point is of the shape shown at an upper right corner of the drawing. In this example, the delay profile at an observing point (marked with a cross in FIG. 13) on the road block may be corrected as follows.

First, distance "d1" between the base station and the measuring point, and distance "d2" between the base station and the observing point are calculated and then the calculated values are used to calculate delay time values t1', t2', t3' in the delay profile of the observing point, by following formula (4). Reference symbols t1, t2, t3 in FIG. 13 denote delay time values in the delay profile of the measuring point.

$$tn'=(d2/d1)*tn(n=1,2,3) \quad \text{Formula (4)}$$

Next, relative receiving levels S1', S2', S3' in the delay profile of the observing point are derived under the following conditions:

$$S1:S2:S3=S1':S2':S3'$$

$$S1'+S2'+S3'=S'$$

Reference symbols S1, S2, S3 denote relative receiving levels at delay time values t1, t2, t3 in the delay profile of the measuring point. Reference symbol S' denotes the corrected signal-receiving electric field strength at the observing point.

The delay profile at an observing point can thus be derived. If a plurality of measuring points are present on the road block, this method can be applied using the measuring point closest to the observing point.

Second Exemplary Embodiment

Figure 14:
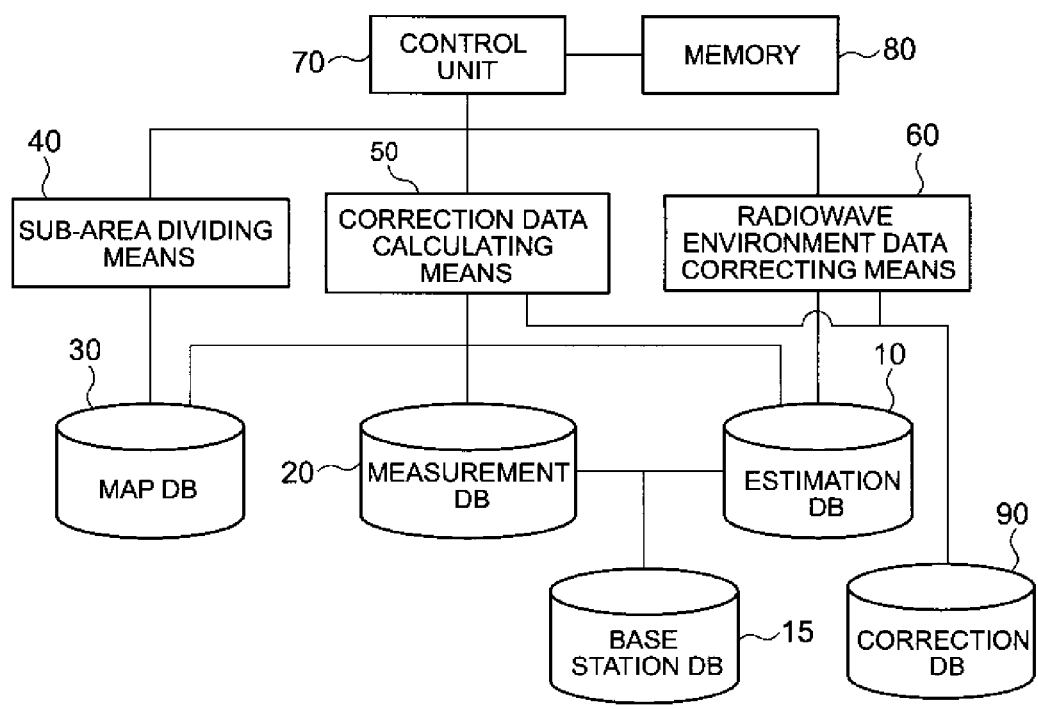
FIG. 14 It depicts a block diagram showing an example of a radiowave environment data correcting system configuration according to a second exemplary embodiment.

Next, a second exemplary embodiment of the present invention is described below. FIG. 14 is a block diagram showing an example of a radiowave environment data correcting system configuration according to the second exemplary embodiment. The radiowave environment data correcting system of the second exemplary embodiment includes a correction database 90 in addition to the elements of the first exemplary embodiment shown in FIG. 1.

The correction database 90 (hereinafter, referred to as the correction DB 90) is a stored collection of correction data that has been calculated using the correcting method of the present invention. Information on the calculated correction data is stored as part of the correction DB 90 so as to be associated with the base station parameter information existing during the calculation of the correction data, as well as information on the sub-areas to which the correction data is applied. More specifically, information on the obtained correction data may be stored in association with identifiers of each sub-area, the correction data in the sub-area, and the base station parameters existing when the correction data was calculated.

Figure 15:
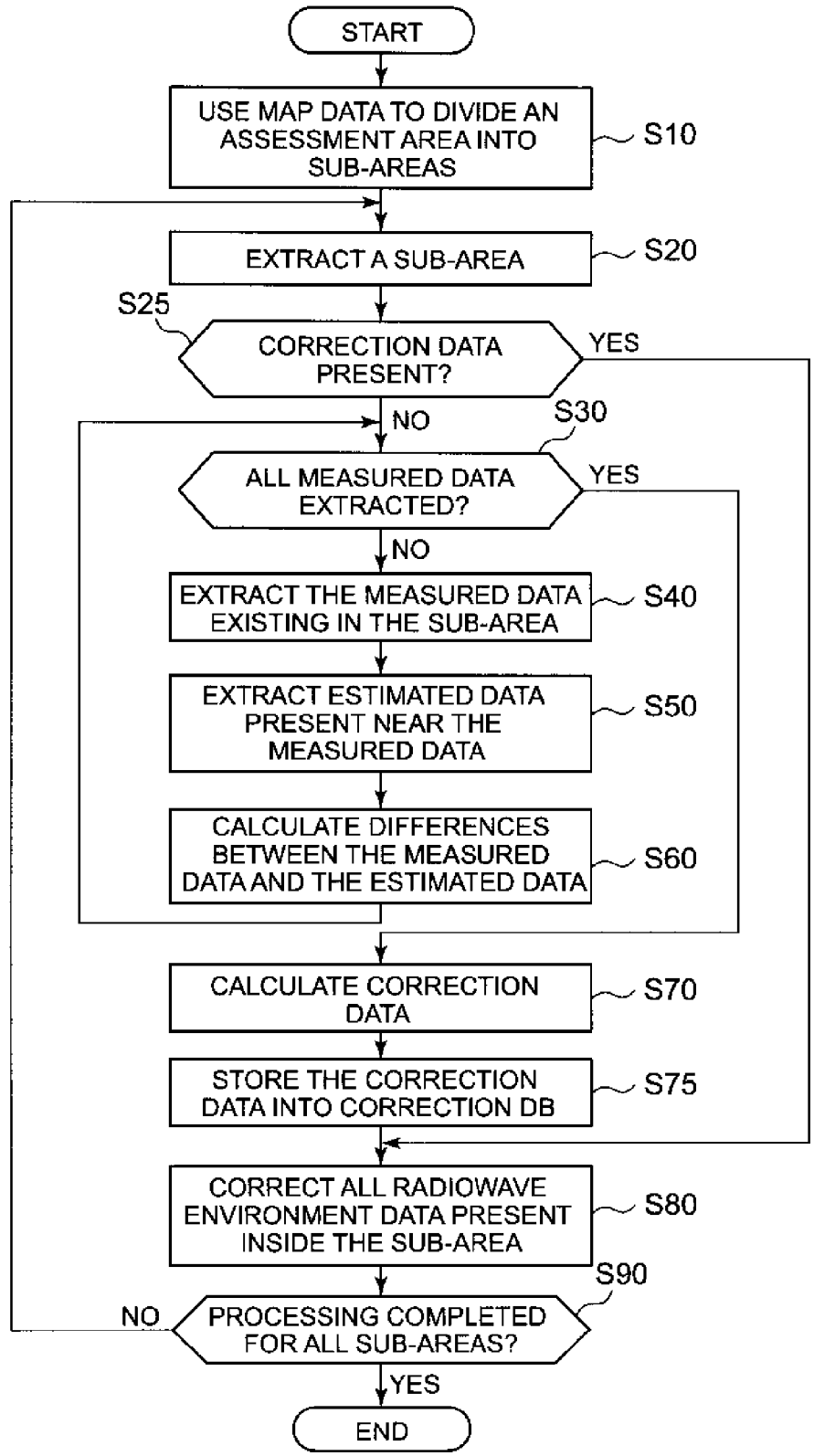
FIG. 15 It depicts a flowchart showing an operational example of the radiowave environment data correcting system according to the second exemplary embodiment.

FIG. 15 is a flowchart showing an operational example of the radiowave environment data correcting system according to the present exemplary embodiment. A technique for using the measured data within the measurement DB 20, the map data within the map DB 30, and the correction data within the correction DB 90, to correct the signal-receiving electric field strength value in the estimation DB 10, is described below with reference to FIG. 15. The field strength in this example was obtained with a designated base station as a transmitting source in a limited (e.g., 2-km square) outdoor assessment area.

Processing in steps S10 to S20 is as discussed in the operational description of the correcting system in the first exemplary embodiment. In the present (second) exemplary embodiment, step S20 is followed by step S25, in which step, the correction DB is searched for stored correction data applicable to the correction process.

The correction data applicable to the correction process refers to correction data that satisfies two requirements. One of the requirements is that the sub-area relevant to the correction data be equal to the sub-area extracted in step S20. The other requirement is that the base station parameters (especially, parameters relating to an installation location, transmission output, and antenna of the base station) that are relevant to the correction data should agree with or be approximate to the base station parameters subjected to the correction process. The requirement that the base station parameters relevant to the correction data should agree with or be approximate to the base station parameters subjected to the correction process refers to a requirement that any differences between the two sets of base station parameters should stay within a predetermined range. One example is that even if the installation location is the same in latitude and longitude (or XY coordinates), altitude (or above-the-ground height), transmission output, horizontal azimuth of the antenna, and antenna gain pattern, a maximum error in vertical azimuth angle of the antenna needs to be five degrees, for example.

If the correction data applicable to the correction process for the base station is present in step S25, processing jumps to step S80 and the correction process is conducted at the observing point in the intended sub-area. If the correction data applicable to the correction process for the base station is absent in step S25, steps S30 to S70 are executed to calculate correction data in a manner similar to that of the first exemplary embodiment. The calculated correction data is stored into the correction DB 90 (step S75). This is followed by the correction in step S80. The above process steps are executed for all sub-areas.

While the presence/absence of correction data has been determined above for each sub-area extracted in step S20, this determination may precede step S10 of division into sub-areas. In this processing form, if the base station parameters relevant to the correction data agree with or are approximate to the base station parameters subjected to the correction process, the correction data in the correction DB 90 is applied to all sub-areas. If there is no applicable correction data, correction data is calculated in the same operational sequence as that of the first exemplary embodiment, and the calculated correction data is stored into the correction DB 90.

Additionally, although the mode in which estimated data, measured data, map data, and correction data are all stored in the database format has been described above, part or all of the four kinds of data may be stored in a non-database format, such as a file.

The present exemplary embodiment has an advantage in that since once calculated correction data is stored into the correction DB 90, there is no need to calculate new correction data for the data estimated under the same conditions. Alternatively, even if the correction data under the same conditions as those of the estimated data is absent, correction becomes possible by applying correction data that has been calculated under approximate conditions.

Thus during optimization of the base station parameters relating to a cellular phone network system, for example, the radiowave propagation estimation results obtained after partial modification of the base station parameters (e.g., the vertical azimuth of the antenna) can be provided with the above correction by calculating correction data for current parameter settings and saving the calculated correction data in the correction DB 90. As a result, estimation accuracy can be improved, even with respect to the conditions where measured data does not exist.

Third Exemplary Embodiment

Figure 16:
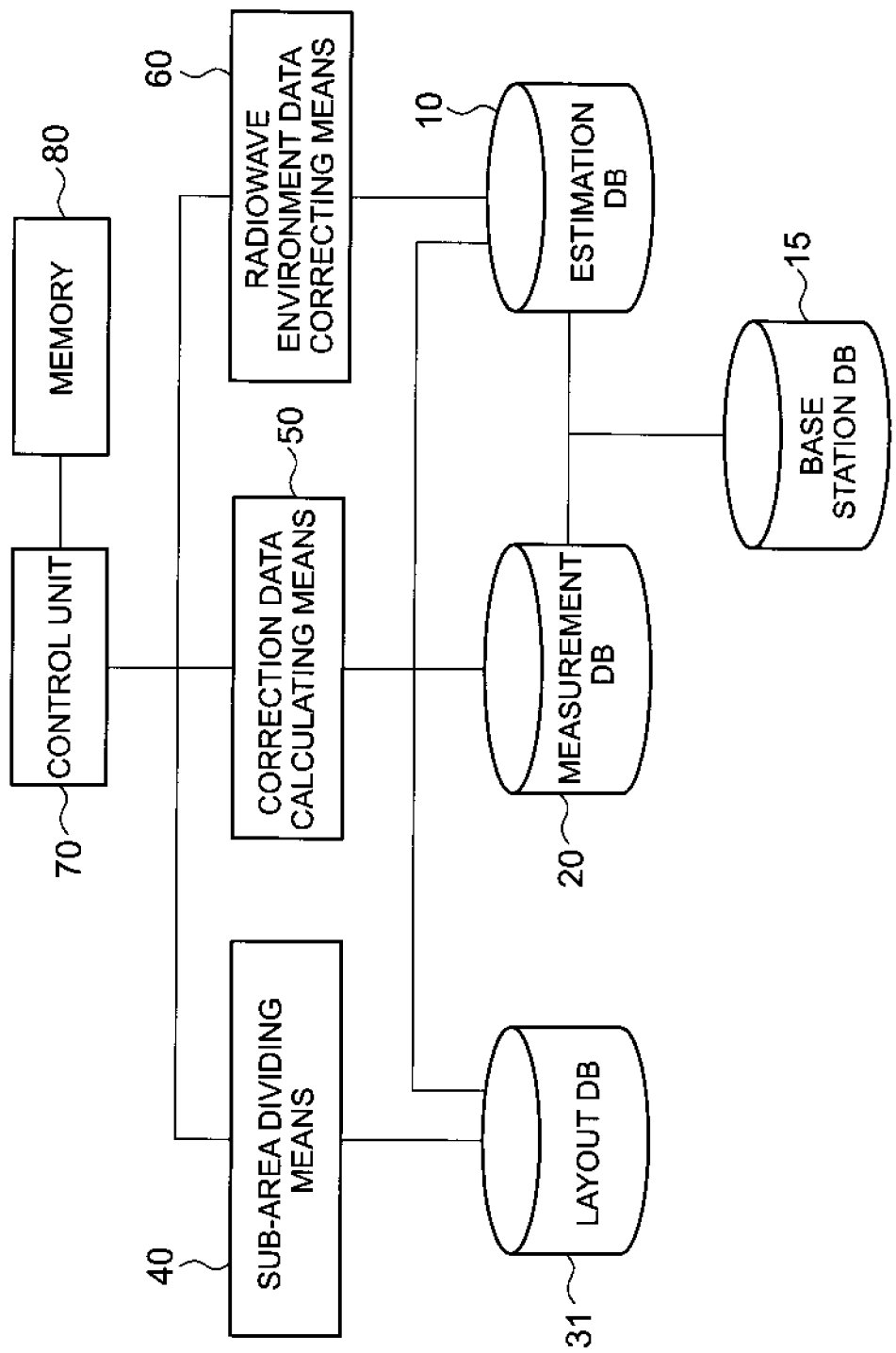
FIG. 16 It depicts a block diagram showing an example of a radiowave environment data correcting system configuration according to a third exemplary embodiment.

Next, a third exemplary embodiment of the present invention is described below. FIG. 16 is a block diagram showing an example of a radiowave environment data correcting system configuration according to the third exemplary embodiment. In the radiowave environment data correcting system of the present exemplary embodiment, the map DB 30 of all elements shown in the first exemplary embodiment of FIG. 1 is replaced by a layout database 31. Whereas the first exemplary embodiment has targeted an outdoor area as the assessment area, the present (third) exemplary embodiment is intended for indoor correction.

The layout database 31 (hereinafter, referred to as the layout DB 31) is a stored collection of layout data that is information on layout of building interior. The layout data preferably contains information (shape, position, etc.) on such objects as furniture and other furnishings, which constitute layout items or articles, and information (shape, position, etc.) on corridors/hallways and stairways. More specifically, stored polygon data indicative of rooms, as well as stored polygon data indicative of such objects as furniture and other furnishings, and stored line data that represents corridors/hallways and stairways in the form of line segments may contain coordinate information.

Figure 17:
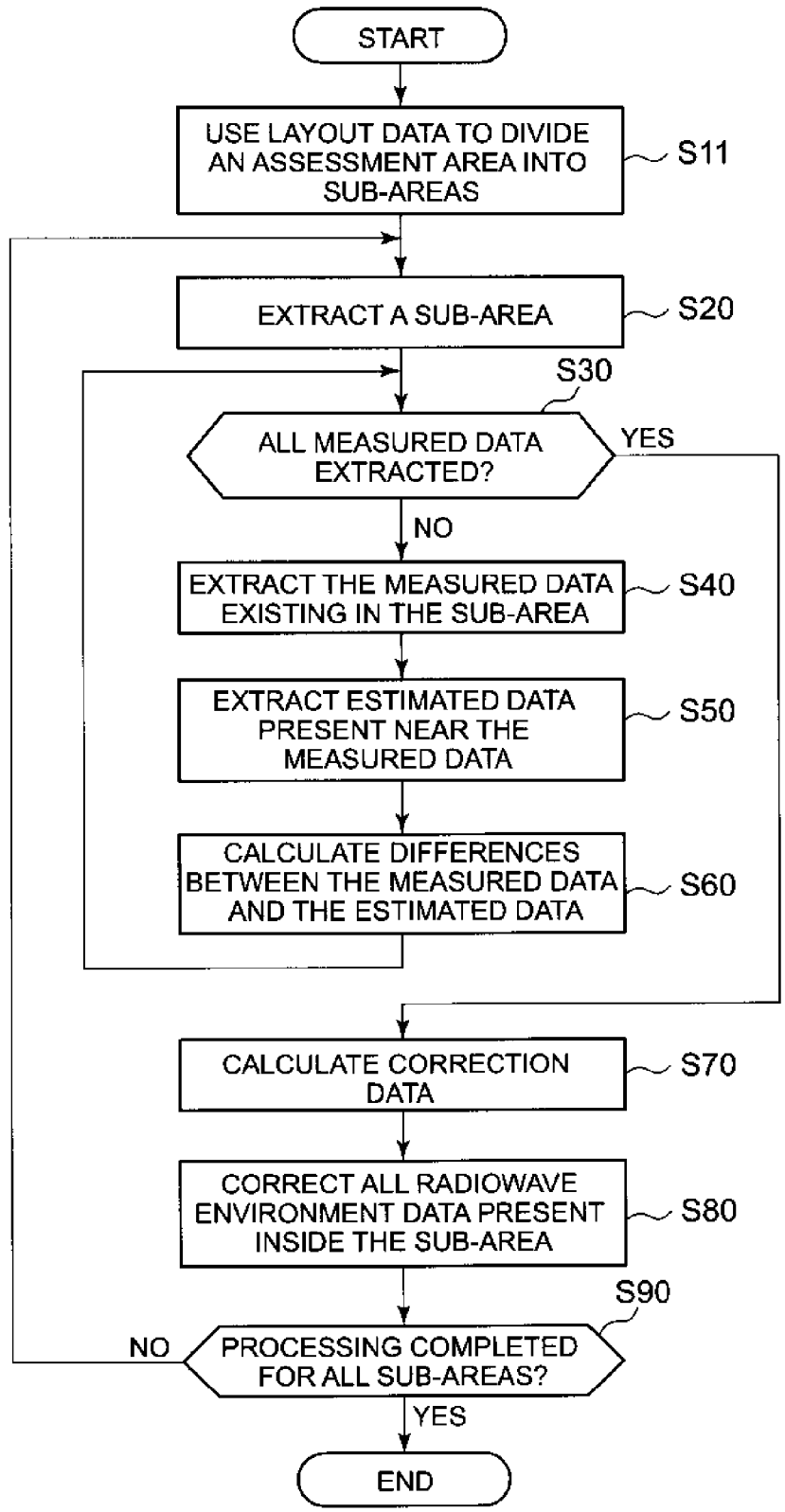
FIG. 17 It depicts a flowchart showing an operational example of the radiowave environment data correcting system according to the third exemplary embodiment.

FIG. 17 is a flowchart showing an operational example of the radiowave environment data correcting system according to the present exemplary embodiment. A technique for using the measured data within the measurement DB 20 and the layout data within the layout DB 31 to correct the signal-receiving electric field strength value within the estimation DB 10 is described below with reference to FIG. 17. The field strength in this example was obtained with a designated base station as a transmitting source in a predetermined building interior assessment area.

According to the third exemplary embodiment, layout data that has been extracted from the layout DB 31, that is, data on the layout of objects and spaces in the assessment area is first used to divide the assessment area into sub-areas according to a particular indoor usage division of the area (step S11). The indoor usage division here is a classification form that represents a usage form of the indoor region according to the way the objects and spaces (corridors/hallways and stairways) are arranged in that region. In other words, the indoor usage division is an indoor application form of the area usage division described earlier herein.

First, internal regions of objects are defined as independent intra-object sub-areas for each object. Next, regions external to the object and internal to rooms are defined as independent intra-room sub-areas for each room. Additionally, a region external to an object or room and present only on a specific corridor/hallway and stairway of all roads, and regions in contact with the region are defined as independent corridor/hallway and stairway sub-areas for each corridor/hallway and room.

The method of division into road sub-areas, described in the first exemplary embodiment described earlier, can also be applied to the method of division into corridor/hallway and stairway sub-areas.

A plurality of corridor/hallway and stairway sub-areas that match one another at both end points of the corridor/hallway and stairway line data may be coupled to form one sub-area, if the corridors/hallways or the stairways lie within a predetermined differential angle range (e.g., 30 degrees). Conversely, one corridor/hallway and stairway sub-area may be divided into a plurality of sub-areas, depending upon an azimuth or distance from the base station.

Processing in step S20 onward is as shown in the first exemplary embodiment.

The present (third) exemplary embodiment is an example in which the assessment area in the first exemplary embodiment is defined as an indoor region. In the present exemplary embodiment, the map DB 30 is replaced by the layout DB 31 as described above. The same process can therefore be conducted by replacing buildings with objects, town blocks with rooms, and roads with corridor/hallways and stairways, for the particular process.

The second exemplary embodiment can also be expanded to indoor usage by replacing environment elements similarly to the above. Additionally, for indoor usage, since indoor application of the present invention features distributing the base station and antenna signals in a height direction, the invention may take a form in which a level of radiowave interference between floors of a building is measured only on one floor, a correction value is calculated from estimated data, and the correction value is applied to other floors as well, on which correction data is not measured.

Figure 18:
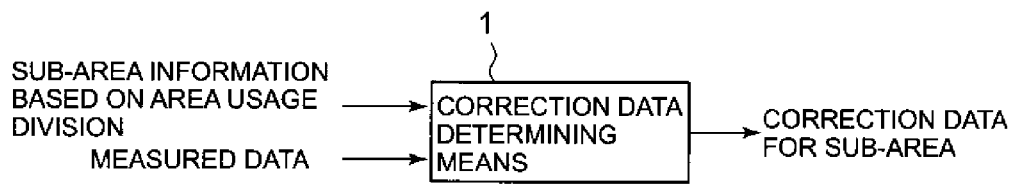
FIG. 18 It depicts a block diagram showing an outline of the present invention.

Next, the present invention is outlined below. FIG. 18 is a block diagram showing the outline of the invention. The radiowave environment data correcting system according to the present invention corrects radiowave environment data using data measurement results obtained at a limited number of measuring points in a base station peripheral area (assessment area) of a wireless communications system, the radiowave environment data being information indicative of radiowave environment characteristics in the assessment area. The correcting system includes a correction data determining means 1.

The correction data determining means 1 (e.g., the correction data calculating means 50) is designed so that for sub-areas formed by dividing the assessment area in accordance with the area usage division predefined according to the particular layout of objects or spaces in the assessment area, the determining means 1 determines correction data using the data measurement results obtained at the measuring points assigned to the sub-areas. An example of the correction data determining means 1 is also shown as the radiowave environment data correcting means 60 that determines using the radiowave environment data retained in the second exemplary embodiment.

Figure 19:
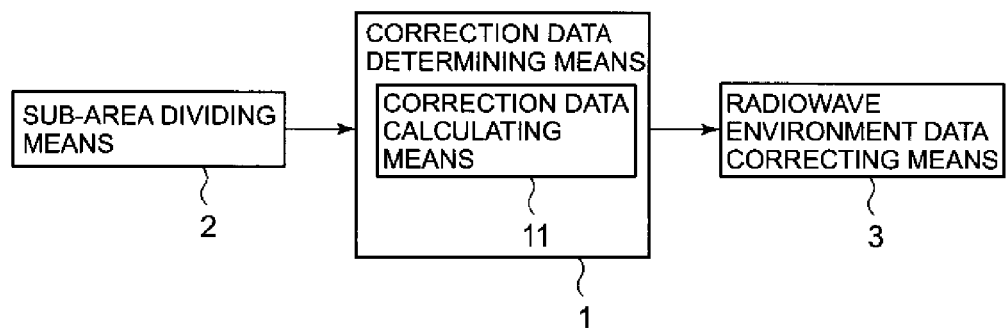
FIG. 19 It depicts a block diagram showing another example of a radiowave environment data correcting system configuration according to the present invention.

FIG. 19 is a block diagram showing another example of a radiowave environment data correcting system configuration according to the present invention. As shown in FIG. 19, in the radiowave environment data correcting system according to the invention, the correction data determining means 1 may include a correction data calculating means 11 and further include a sub-area dividing means 2 and a radiowave environment data correcting means 3.

The sub-area dividing means 2 (e.g., the sub-area dividing means 40) divides the assessment area into sub-areas in accordance with the area usage division.

The correction data calculating means 11 (e.g., the correction data calculating means 50) uses the data measurement results obtained at measuring points in sub-areas, to calculate the correction data for the sub-areas.

The radiowave environment data correcting means 3 (e.g., the radiowave environment data correcting means 60) uses the calculated correction data to correct the radiowave environment data in the sub-areas.

Figure 20:
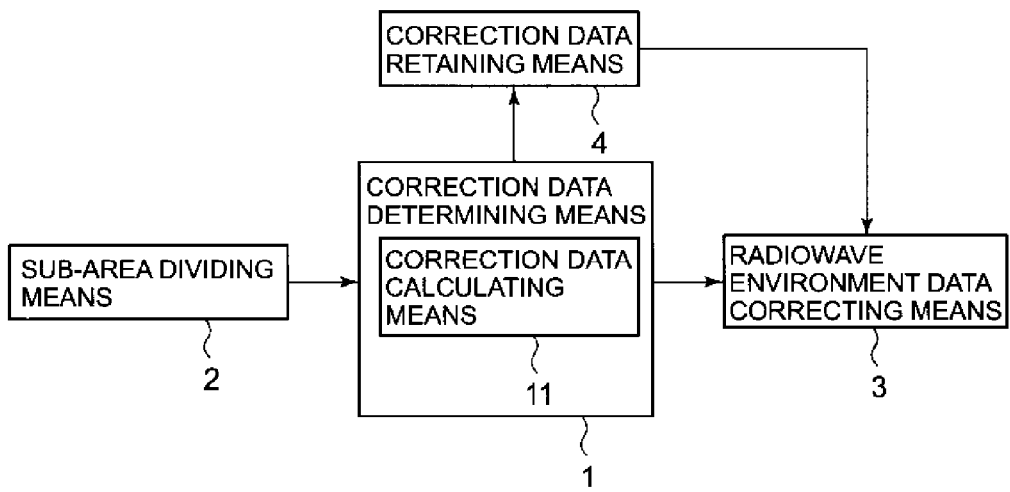
FIG. 20 It depicts a block diagram showing yet another example of a radiowave environment data correcting system configuration according to the present invention.

As shown in FIG. 20, the radiowave environment data correcting system configuration according to the present invention may additionally include a correction data retaining means 4. The correction data retaining means 4 (e.g., a system for the correction DB 90) retains the correction data obtained in the invention. In such a case, if the base station parameters corresponding to the radiowave environment data to be corrected agree with the base station parameters that are used during the determination of the correction data retained in the correction data retaining means 4, or if any differences between the two sets of parameters stay within a preset range, the radiowave environment data correcting means 3 may use the retained correction data to correct the radiowave environment data.

In addition, if the assessment area is provided outdoors, the correcting system may instead use an area usage division in which a road having its own angle variation rate decreasing below a preset level is defined as the same sub-area as that of the peripheral area. Furthermore, if the assessment area is provided indoors, the correcting system may use an area usage division in which the same room interior or same floor as that of the peripheral area is defined as the same sub-area.

Referring further to sub-areas, a sub-area obtained by division based on the area usage division may be further divided into regions according to the particular azimuth relative to, or distance from, the base station, and the thus-obtained regions may be used as sub-areas to be subjected to data correction. Otherwise, a sub-area obtained by division based on the area usage division may be further divided into regions according to a particular distribution state of measured data, and the thus-obtained regions may be used as sub-areas to be subjected to data correction.

Furthermore, radiowave environment data can be the data estimated from calculations based on radiowave propagation simulation. Besides, the radiowave propagation simulation itself can be based on the ray-tracing method.

These features of the radiowave environment data correcting system according to the present invention allow the correcting system to correct radiowave environment data more accurately using the measured data at a limited number of measuring points in the base station peripheral area of the wireless communications system. In particular, the above features enable the correction of radiowave environment data for significantly improved estimation accuracy, even in cities as well as indoors. These features of the radiowave environment data correcting system according to the present invention are also implemented as a radiowave environment data correcting method or a radiowave environment data correcting program.

The sub-area dividing means, correction data calculating means, and radiowave environment data correcting means shown in the above exemplary embodiment may be implemented as one unit. The three elements may also be implemented as independent units. In addition, the databases shown in the above exemplary embodiment may be implemented as one unit. The databases may also be implemented as independent units.

Such characteristic constituent elements of the radiowave environment data correcting system that are described in items (1) to (10) below are shown in the above exemplary embodiment.

(1) The radiowave environment data correcting system includes a correction data determining element implemented by, for example, the correction data determining means 1 or the correction data calculating means 50. Referring to the sub-areas formed by dividing the base station peripheral area of a wireless communications system in accordance with the area usage division predefined according to the particular layout of objects or spaces in the base station peripheral area, the correction data determining element uses the measured data at measuring points in those sub-areas to determine the correction data for correcting the radiowave environment data that is information indicative of the radiowave environment characteristics in the base station peripheral area.

(2) The correction data determining element in the radiowave environment data correcting system may include a correction data calculator that uses the measured data at measuring points in the corresponding sub-areas to calculate the correction data obtained in the sub-areas. The radiowave environment data correcting system itself may further include a sub-area divider that divides the base station peripheral area into sub-areas in accordance with the area usage division, and a radiowave environment corrector that corrects the radiowave environment data in those sub-areas using the correction data calculated by the correction data calculator.

(3) The radiowave environment data correcting system may further include a correction data retainer to retain the correction data, with the radiowave environment corrector being configured so that if the base station parameters corresponding to the radiowave environment data to be corrected agree with the base station parameters that are used during the determination of the correction data retained in the correction data retainer or if any differences between the two sets of parameters stay within a preset range, the radiowave environment corrector will use the retained correction data to correct the radiowave environment data.

(4) The radiowave environment data correcting system may be constructed so that if the base station peripheral area is provided outdoors, the correcting system will use an area usage division in which a road having its own angle variation rate decreasing below a preset level is defined as the same sub-area as that of the peripheral area.

(5) The radiowave environment data correcting system may be constructed so that if the base station peripheral area is provided indoors, the correcting system will use an area usage division in which the same room interior or same floor as that of the peripheral area is defined as the same sub-area.

(6) The radiowave environment data correcting system may be constructed so that a sub-area obtained by division based on the area usage division will be further divided into regions according to the particular azimuth relative to, or distance from, the base station, and so that these regions will be used as the sub-areas to be subjected to independent data correction.

(7) The radiowave environment data correcting system may be constructed so that a sub-area obtained by division based on the area usage division may be further divided into regions according to the particular distribution of the measured data, and so that the regions may be used as the sub-areas to be subjected to independent data correction.

(8) The radiowave environment data in the radiowave environment data correcting system may be the data estimated from calculations based on radiowave propagation simulation.

(9) The radiowave propagation simulation in the radiowave environment data correcting system can use a ray tracing method.

(10) The radiowave environment data correcting system may include a correction data determining means implemented by, for example, the correction data determining means 1 or the correction data calculating means 50. Referring to the sub-areas formed by dividing the base station peripheral area of a wireless communications system in accordance with the area usage division predefined according to the particular layout of objects or spaces in the base station peripheral area, the correction data determining means may use the measured data at measuring points in those sub-areas to determine the correction data for correcting the radiowave environment data that is the information indicative of the radiowave environment characteristics in the base station peripheral area.

Although the invention according to this application has been described above referring to the above exemplary embodiments and examples, the invention is not limited to or by the exemplary embodiments and examples. Various modifications and changes understandable to persons skilled in the art can be performed, within the scope of the invention, upon the configuration and details thereof.

This application claims priority based on Japanese Patent Application No. 2008-313261 filed on Dec. 9, 2008, the disclosure of which is incorporated in its entirety by reference into this application.

INDUSTRIAL APPLICABILITY

The present invention can be used in applications such as designing service areas for mobile communications. In particular, the invention can be applied to managing a service area both accurately and efficiently when a base station for which the service area is to be designed is installed at a designated position and with designated parameters.

REFERENCE SIGNS LIST

1 Correction data determining means
11 Correction data calculating means
2 Sub-area dividing means
3 Radiowave environment data correcting means
4 Correction data retaining means
10 Estimation database
20 Measurement database
30 Map database
40 Sub-area dividing means
50 Correction data calculating means
60 Radiowave environment data correcting means
70 Control unit
80 Memory

The invention claimed is:
1. A radiowave environment data correcting system, comprising correction data determining means that determines correction data for correcting radiowave environment data for sub-areas, the sub-areas being regions into which a peripheral area of a base station provided for a wireless communications system is divided, on the basis of data measurement results obtained at measuring points belonging to the sub-areas, wherein the radiowave environment data is information that indicates radiowave environment characteristics in the peripheral area of the base station, wherein division into the regions of the sub-areas is based on an area usage division that is a division predefined according to a particular layout of objects or spaces in the peripheral area of the base station, and wherein the correction data determining means includes correction data calculating means that calculates the correction data in the sub-areas using the data measurement results obtained at the measuring points existing in the sub-areas; and the system further comprising sub-area dividing means that divides the base station peripheral area into the sub-areas in accordance with the area usage division, and radiowave environment data correcting means that corrects the radiowave environment data in the sub-areas using the correction data calculated by the correction data calculating means.

2. The radiowave environment data correcting system according to claim 1, further comprising correction data retaining means that retains the correction data, wherein the radiowave environment data correcting means corrects the radiowave environment data by using the retained correction data, in case parameters of the base station corresponding to the radiowave environment data to be corrected are the same as parameters of the base station that are used during the determination of the correction data retained in the correction data retaining means, or in case any differences between the two sets of parameters stay within a predetermined range.

3. The radiowave environment data correcting system according to claim 1, using an area usage division in which a road having its own angle variation rate decreasing below a preset level is defined as the same sub-area as that of the peripheral area, in case the base station peripheral area is provided outdoors.

4. The radiowave environment data correcting system according to claim 1, using an area usage division in which the same room or same floor as that of the peripheral area is defined as the same sub-area, in case the base station peripheral area is provided indoors.

5. The radiowave environment data correcting system according to claim 1, using regions into which a sub-area obtained by division based on the area usage division has been further divided according to a particular azimuth relative to, or distance from, the base station, as sub-areas to be each subjected to independent data correction.

6. The radiowave environment data correcting system according to claim 1, using regions into which a sub-area obtained by division based on the area usage division has been further divided according to a particular distribution of the measured data, as sub-areas to be each subjected to independent data correction.

7. The radiowave environment data correcting system according to claim 1, wherein the radiowave environment data is data estimated from calculations based upon radiowave propagation simulation.

8. The radiowave environment data correcting system according to claim 7, wherein the radiowave propagation simulation uses a ray-tracing method.

9. A radiowave environment data correcting method comprising:

determining correction data for correcting radiowave environment data for sub-areas, the sub-areas being regions into which a peripheral area of a base station provided for a wireless communications system is divided, on the basis of data measurement results obtained at measuring points belonging to the sub-areas, wherein the radiowave environment data is information that indicates radiowave environment characteristics in the peripheral area of the base station, and wherein division into the regions of the sub-areas is based on an area usage division that is a division predefined according to a particular layout of objects or spaces in the peripheral area of the base station;

dividing the base station peripheral area into sub-areas in accordance with the area usage division;

calculating the correction data in the sub-areas using the data measurement results obtained at the measuring points existing in sub-areas; and correcting the radiowave environment data in the sub-area using the calculated correction data.

10. The radiowave environment data correcting method according to claim 9, further comprising:

allowing a storage device to retain the correction data; and correcting the radiowave environment data using the retained correction data, in case parameters of the base station corresponding to the radiowave environment data to be corrected are the same as parameters of the base station that are used during the determination of the retained correction data, or in case any differences between the two sets of parameters stay within a predetermined range.

11. The radiowave environment data correcting method according to claim 9, further comprising: using an area usage division in which a road having its own angle variation rate decreasing below a preset level is defined as the same sub-area as that of the peripheral area, in case the base station peripheral area is provided outdoors.

12. The radiowave environment data correcting method according to claim 9, further comprising: using an area usage division in which the same room or same floor as that of the peripheral area is defined as the same sub-area, in case the base station peripheral area is provided indoors.

13. The radiowave environment data correcting method according to claim 9, further comprising: using regions into which a sub-area obtained by division based on the area usage division has been further divided according to a particular azimuth relative to, or distance from, the base station, as sub-areas to be each subjected to independent data correction.

14. The radiowave environment data correcting method according to claim 9, further comprising: using regions into which a sub-area obtained by division based on the area usage division has been further divided according to a particular distribution of the measured data, as sub-areas to be each subjected to independent data correction.

15. The radiowave environment data correcting method according to claim 9, wherein the radiowave environment data is data estimated from calculations based upon radiowave propagation simulation.

16. The radiowave environment data correcting method according to claim 15, wherein the radiowave propagation simulation uses a ray-tracing method.

17. A radiowave environment data correcting program for making a computer perform:

determining correction data for correcting radiowave environment data for sub-areas, the sub-areas being regions into which a peripheral area of a base station provided for a wireless communications system is divided, on the basis of data measurement results obtained at measuring points belonging to the sub-areas, wherein the radiowave environment data is information that indicates radiowave environment characteristics in the peripheral area of the base station, and wherein division into the regions of the sub-areas is based on an area usage division that is a division predefined according to a particular layout of objects or spaces in the peripheral area of the base station;

dividing the base station peripheral area into sub-areas in accordance with the area usage division;

calculating the correction data in the sub-areas using the data measurement results obtained at the measuring points existing in the sub-areas; and correcting the radiowave environment data in the sub-areas using the calculated correction data.

18. The radiowave environment data correcting program according to claim 17, the program making the computer with correction data retaining means perform:

correcting the radiowave environment data using the retained correction data, in case parameters of the base station corresponding to the radiowave environment data to be corrected are the same as parameters of the base station that are used during the determination of the retained correction data, or in case any differences between the two sets of parameters stay within a predetermined range.

19. The radiowave environment data correcting program according to claim 17, the program making the computer perform:

using an area usage division in which a road having its own angle variation rate decreasing below a preset level is defined as the same sub-area as that of the peripheral area, in case the base station peripheral area is provided outdoors.

20. The radiowave environment data correcting program according to claim 17, the program making the computer perform:

using an area usage division in which the same room or same floor as that of the peripheral area is defined as the same sub-area, in case the base station peripheral area is provided indoors.

21. The radiowave environment data correcting program according to claim 17, the program making the computer perform:

using regions into which a sub-area obtained by division based on the area usage division has been further divided according to a particular azimuth relative to, or distance from, the base station, as sub-areas to be each subjected to independent data correction.

22. The radiowave environment data correcting program according to claim 17, the program making the computer perform:

using regions into which a sub-area obtained by division based on the area usage division has been further divided according to a particular distribution of the measured data, as sub-areas to be each subjected to independent data correction.

* * * * *